(12) United States Patent
Yamada

(10) Patent No.: US 7,746,342 B2
(45) Date of Patent: Jun. 29, 2010

(54) DRAWING PROCESSING APPARATUS, TEXTURE PROCESSING APPARATUS, AND TESSELLATION METHOD

(75) Inventor: Hideshi Yamada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1163 days.

(21) Appl. No.: 11/360,844

(22) Filed: Feb. 23, 2006

(65) Prior Publication Data

US 2006/0197760 A1 Sep. 7, 2006

(30) Foreign Application Priority Data

Mar. 1, 2005 (JP) ............................. 2005-056118

(51) Int. Cl.
*G06T 15/00* (2006.01)

(52) U.S. Cl. ...................... 345/423; 345/419; 345/582; 703/6; 703/11

(58) Field of Classification Search ................. 345/419, 345/423, 424, 428, 582; 703/6, 11
See application file for complete search history.

(56) References Cited

U.S. PATENT DOCUMENTS 5,253,336 A  10/1993 Yamada
6,111,588 A *  8/2000 Newell ..................... 345/442

6,600,485 B1 *  7/2003 Yoshida et al. ............ 345/419
6,867,774 B1 *  3/2005 Halmshaw et al. ......... 345/424
7,012,608 B1 *  3/2006 Fujisaki .................... 345/474
7,245,299 B2 *  7/2007 Sfarti ....................... 345/423
7,386,429 B1 *  6/2008 Fujisaki ....................... 703/6

FOREIGN PATENT DOCUMENTS

JP        3-48375         3/1991
JP    2001-331812        11/2001

* cited by examiner

*Primary Examiner*—Phu K Nguyen
(74) *Attorney, Agent, or Firm*—Katten Muchin Rosenman LLP

(57) ABSTRACT

A drawing processing apparatus for performing tessellation processing, comprising a pixel shader and a texture unit. An internal division operation part of the pixel shader issues texture load instructions to the texture unit, specifying parametric coordinate values of a patch of a parametric surface, and thereby acquires internal division factors interpolated based on the parametric coordinate values from the texture unit. The internal division operation part issues texture load instructions to the texture unit further, specifying the internal division factors acquired from the texture unit as new interpolation factors, and thereby acquires control points internally divided based on the internal division factors in advance from the texture unit. Based on the internal division factors corresponding to the parametric coordinate values, the internal division operation part performs recursive internal division operations on the control points acquired from the texture unit, thereby determining a point on the parametric surface corresponding to the parametric coordinate values.

5 Claims, 19 Drawing Sheets

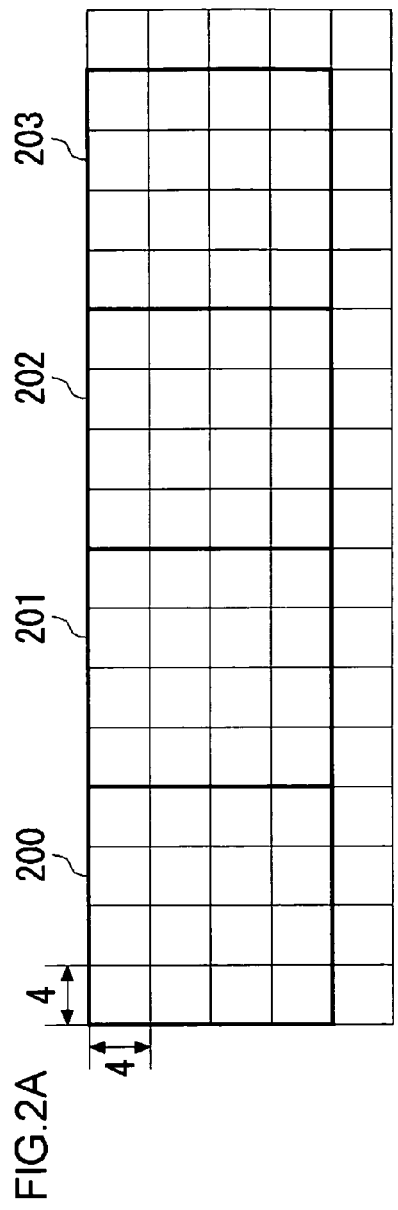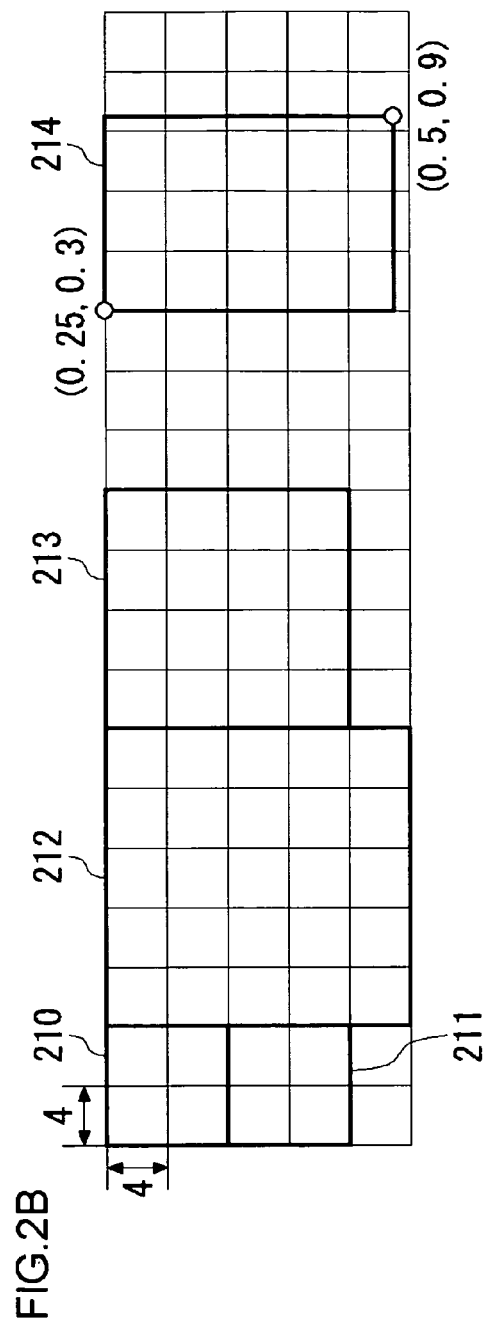

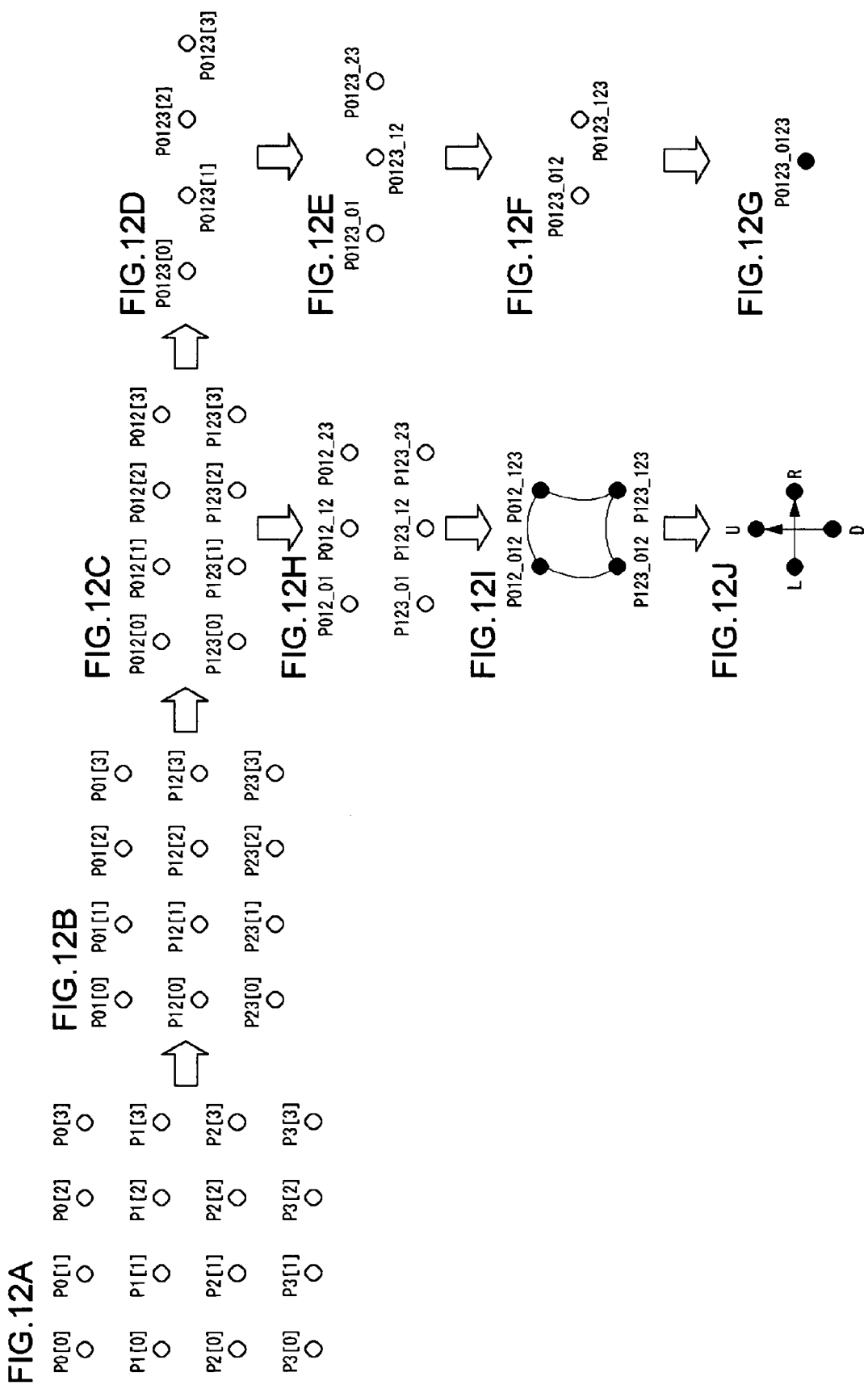

(2) OPEN-OPEN (3) OPEN-CLOSED:OPEN   (7) OPEN:CLOSED-OPEN (4) OPEN-CLOSED:CLOSED   (6) CLOSED:CLOSED-OPEN
(5) OPEN:CLOSED-CLOSED:OPEN

FIG.15

| SEGMENT | | START-POINT SIDE ADJOINING SEGMENT | END-POINT SIDE ADJOINING SEGMENT | TYPE |
|---|---|---|---|---|
| START POINT | END POINT | | | |
| CLOSED | CLOSED | CLOSED | CLOSED | (1) |
| CLOSED | CLOSED | OPEN | OPEN | (5) |
| CLOSED | CLOSED | OPEN | CLOSED | (8) |
| CLOSED | CLOSED | CLOSED | OPEN | (9) |
| OPEN | OPEN | — | — | (2) |
| OPEN | CLOSED | — | OPEN | (3) |
| OPEN | CLOSED | — | CLOSED | (4) |
| CLOSED | OPEN | CLOSED | — | (6) |
| CLOSED | OPEN | OPEN | — | (7) |

FIG.17

| $N_{j,m}$ | j=0 | j=1 | j=2 | j=3 | 4 | 5 | 6 | 7 |
|---|---|---|---|---|---|---|---|---|
| M=1 | 0 | 0 | 0 | 1 | 0 | 0 | 0 | |
| M=2 | 0 | 0 | $0 + \frac{(t_4-t)}{(t_4-t_3)} N_{3,1}(t)$ | $\frac{(t-t_3)}{(t_4-t_3)} N_{3,1}(t) + 0$ | 0 | 0 | | |
| M=3 | 0 | $0 + \frac{(t_4-t)}{(t_4-t_2)} N_{2,2}(t)$ | $\frac{(t-t_2)}{(t_4-t_2)} N_{2,2}(t) + \frac{(t_5-t)}{(t_5-t_3)} N_{3,2}(t)$ | $\frac{(t-t_3)}{(t_5-t_3)} N_{3,2}(t) + 0$ | 0 | | | |
| M=4 | $0 + \frac{(t_4-t)}{(t_4-t_1)} N_{1,3}(t)$ | $\frac{(t-t_1)}{(t_4-t_1)} N_{1,3}(t) + \frac{(t_5-t)}{(t_5-t_2)} N_{2,3}(t)$ | $\frac{(t-t_2)}{(t_5-t_2)} N_{2,3}(t) + \frac{(t_6-t)}{(t_6-t_3)} N_{3,3}(t)$ | $\frac{(t-t_3)}{(t_6-t_3)} N_{3,3}(t) + 0$ | | | | |

FIG.18

| | j=0 | j=1 | j=2 | j=3 | 4 | 5 | 6 | 7 |
|---|---|---|---|---|---|---|---|---|
| M=1 | 0 | 0 | 0 | 1 | 0 | 0 | 0 | |
| M=2 | 0 | 0 | $0 + B_{2,2} N_{3,1}(t)$ | $A_{3,2} N_{3,1}(t) + 0$ | 0 | 0 | | |
| M=3 | 0 | $0 + B_{1,3} N_{2,2}(t)$ | $A_{2,3} N_{2,2}(t) + B_{2,3} N_{3,2}(t)$ | $A_{3,3} N_{3,2}(t) + 0$ | 0 | | | |
| M=4 | $0 + B_{0,4} N_{1,3}(t)$ | $A_{1,4} N_{1,3}(t) + B_{1,4} N_{2,3}(t)$ | $A_{2,4} N_{2,3}(t) + B_{2,4} N_{3,3}(t)$ | $A_{3,4} N_{3,3}(t) + 0$ | | | | |

FIG.19

| TYPE | $a_{00}$ | $a_{10}$ | $a_{20}$ | $a_{01}$ | $a_{11}$ | $a_{02}$ |
|---|---|---|---|---|---|---|
| (1) | $(t+2)/3$ | $(t+1)/3$ | $t/3$ | $(t+1)/2$ | $t/2$ | $t$ |
| (2) | $t$ | $t$ | $t$ | $t$ | $t$ | $t$ |
| (3) | $t$ | $t/2$ | $t/2$ | $t$ | $t/2$ | $t$ |
| (4) | $t$ | $t/2$ | $t/3$ | $t$ | $t/2$ | $t$ |
| (5) | $(t+1)/2$ | $(t+1)/3$ | $t/2$ | $(t+1)/2$ | $t/2$ | $t$ |
| (6) | $(t+2)/3$ | $(t+1)/3$ | $t$ | $(t+1)/2$ | $t$ | $t$ |
| (7) | $(t+1)/2$ | $(t+1)/2$ | $t$ | $(t+1)/2$ | $t$ | $t$ |
| (8) | $(t+1)/2$ | $(t+1)/3$ | $t/3$ | $(t+1)/2$ | $t/2$ | $t$ |
| (9) | $(t+2)/3$ | $(t+1)/3$ | $t/2$ | $(t+1)/2$ | $t/2$ | $t$ |

DRAWING PROCESSING APPARATUS, TEXTURE PROCESSING APPARATUS, AND TESSELLATION METHOD

BACKGROUND OF THE INVENTION

1. Field of the Invention

The invention relates a drawing processing apparatus, a texture processing apparatus, and a tessellation method for processing drawing data.

2. Description of the Related Art

When generating three-dimensional models of drawing objects, free-form surfaces are often used so as to render more complicated shapes. Among the techniques for rendering free-form surfaces, NURBS (Non-Uniform Rational B-Spline) curves or NURBS surfaces are in widespread use since they have the advantage that smooth curves or surfaces can be rendered with a smaller number of control points. Aside from control points, NURBS has a lot of shape-operating parameters such as weights and knots, which allow local modifications in shape. NURBS also has excellent rendering capabilities such that arcs, straight lines, and conic sections including parabolas can be expressed systematically. In three-dimensional computer graphics, technologies for rendering drawing models created in NURBS data are being sought after.

Objects smoothly rendered in the form of NURBS, Bezier, or other parametric surfaces are represented by parameters such as control points. This allows a reduction in the amount of data as compared to polygonal models in which three-dimensional objects are expressed as sets of polygons such as triangles. In some applications including network games, three-dimensional model information is transmitted over networks. The object representation using free-form surfaces is suited even to such network applications because of the smaller amount of data.

When drawing three-dimensional models rendered in free-form surfaces, the free-form surfaces are divided into polygons, and rendering algorithms are applied thereto for the sake of drawing processing. To divide a free-form surface into polygons, the values of parameters in the equation of the NURBS- or otherwise-defined parametric surface are changed at predetermined pitches, whereby vertexes on the parametric surface are determined directly. These points are then connected to generate the polygons. As a result, the parametric surface is subdivided into a lot of polygons with a predetermined number of divisions. This processing is called tessellation processing.

In the tessellation processing, determining the coordinate values of the vertexes on a parametric surface requires that computing be repeated on the control points that define the shape of the parametric surface. This tessellation processing, when implemented by software, consumes a considerable computing time due to the large amount of calculation. The tessellation processing is thus not suited to three-dimensional computer graphic applications that need to display the result of drawing in real time. The tessellation processing is also difficult to implement by hardware since high memory capacities are required in order to store the data necessary for the tessellation processing and intermediate calculation results.

Attempts have thus been made to reduce the amount of computation and the amount of memory by limiting the degree of freedom of the surface, by such means as decreasing the number of divisions in the tessellation processing with a reduction in the amount of computation, reducing the number of control points, and using simpler curve equations. In consequence, however, the objects to be drawn are rendered in coarse polygons, which has produced the problem that CG images of sufficient quality cannot be generated.

SUMMARY OF THE INVENTION

The present invention has been achieved in view of the foregoing problems. The present invention relates to a drawing processing technology capable of performing tessellation processing efficiently in terms of the amount of computation. The present invention also relates to a drawing processing technology that is advantageous in terms of the memory capacity when performing tessellation processing.

To solve the foregoing problems, one embodiment of the present invention provides a drawing processing apparatus for making an approximation to an object to be drawn with a parametric curve represented by coordinate points associated with a single parameter. The apparatus comprises: a factor data memory part which stores a group of representative values of an internal division factor at two points in a domain of the parameter in a one-dimensional parametric coordinate system defined for each of segments, or component units, of the parametric curve, the internal division factor being given by a linear function of the parameter; an interpolation processing part which interpolates the group of representative values of the internal division factor stored in the factor data memory part by using a linear interpolator with a value of the parameter specified in a segment to be processed as an interpolation factor, thereby calculating an interpolated value of the internal division factor corresponding to the specified value of the parameter; and a subdivision processing part which performs an internal division operation on a plurality of control points defining shape of the segment to be processed at a ratio based on the interpolated value of the internal division factor, thereby calculating a vertex coordinate on the parametric curve corresponding to the specified value of the parameter in the segment to be processed.

Another embodiment of the present invention is also a drawing processing apparatus. This drawing processing apparatus is one for making an approximation to an object to be drawn with a parametric surface represented by coordinate points associated with a pair of parameters. The apparatus comprises: a factor data memory part which stores a group of representative values of a first internal division factor at two points in a domain of a first parameter in a two-dimensional parametric coordinate system defined for each of patches, or component units, of the parametric surface, the first internal division factor being given by a linear function of the first parameter; an interpolation processing part which interpolates the group of representative values of the first internal division factor stored in the factor data memory part by using a linear interpolator with a value of the first parameter specified in a patch to be processed as an interpolation factor, thereby calculating an interpolated value of the first internal division factor corresponding to the specified value of the first parameter; and a subdivision processing part which performs an internal division operation on a plurality of control points defining shape of the patch to be processed in an axial direction of the first parameter in the two-dimensional parametric coordinate system at a ratio based on the interpolated value of the first internal division factor.

Yet another embodiment of the present invention is also a drawing processing apparatus. This apparatus comprises: a texture memory part which stores data on a texture; a texture processing part which interpolates the data on the texture stored in the texture memory part by using a linear interpolator based on a specified value of a parametric coordinate defined for each of units of drawing processing, thereby calculating interpolated data on the texture corresponding to the specified value of the parametric coordinate; and a drawing processing part which processes the units of drawing processing by using the interpolated data on the texture. The units of drawing processing are segments or component units of a parametric curve represented by a one-dimensional parametric coordinate, or patches or component units of a parametric surface represented by two-dimensional parametric coordinates. The texture memory part stores a group of representative values of an internal division factor at two points in a domain of a parameter as the data on the texture, the internal division factor depending on the parametric coordinate(s) defined for each of the segments or patches. The texture processing part interpolates the group of representative values of the internal division factor by using a linear interpolator with values of the parametric coordinate(s) successively specified by the drawing processing part as to a segment or patch to be processed as interpolation factors, thereby calculating interpolated values of the internal division factor corresponding to the specified values of the parametric coordinate(s). The drawing processing part performs an internal division operation on a plurality of control points defining shape of the segment or patch to be processed at ratios based on the interpolated values of the internal division factor, thereby calculating a vertex coordinate or vertex coordinates on the parametric curve or the parametric surface corresponding to the specified values of the parametric coordinate(s) in the segment or patch to be processed.

Yet another embodiment of the present invention is a texture processing apparatus. This apparatus comprises: a texture memory part which stores data on a texture; and a texture processing part which interpolates the data on the texture stored in the texture memory part by using a linear interpolator based on a specified value of a parametric coordinate defined for each of units of drawing processing, thereby calculating interpolated data on the texture corresponding to the specified value of the parametric coordinate. The units of drawing processing are segments or component units of a parametric curve represented by a one-dimensional parametric coordinate, or patches or component units of a parametric surface represented by two-dimensional parametric coordinates. The texture memory part stores groups of a plurality of control points defining shape of the respective segments or patches. The texture processing part acquires the group of a plurality of control points to be applied to a segment or patch to be processed from the texture memory part, and performs an internal division operation thereon by using the linear interpolator, thereby calculating a vertex coordinate or vertex coordinates on the parametric curve or the parametric surface corresponding to the specified value(s) of the parametric coordinate(s) in the segment or patch to be processed.

Yet another embodiment of the present invention is a data structure of a texture. This data structure of a texture has three-dimensional coordinate values of control points defining shape of a parametric surface are stored as texel values. The texture is configured so that, in response to a texture read instruction accompanied with a specified value of a parameter in a coordinate system of the parametric surface, the coordinate values of adjoining two of the control points can be sampled to calculate interpolated values of the coordinate values of the control points corresponding to the specified value.

Yet another embodiment of the present invention is also a data structure of a texture. This data structure of a texture has initial values and final values of internal division factors for use in a recursive internal division operation on control points defining shape of a parametric surface are stored as adjoining texel values. The texture is configured so that, in response to a texture read instruction accompanied with a specified value of a parameter in a coordinate system of the parametric surface, the initial values and the final values of the internal division factors can be sampled to calculate interpolated values of the internal division factors corresponding to the specified value.

Yet another embodiment of the present invention is a tessellation method. This tessellation method is one for subdividing a parametric curve represented by coordinate points associated with a single parameter into lines. The method comprises: storing in advance an initial value and a final value of an internal division factor at both ends of a domain of a parameter in a one-dimensional parametric coordinate system defined for each of segments, or component units, of the parametric curve into a factor table, the internal division factor having a value depending on the parameter, and interpolating the initial value and the final value of the internal division factor stored in the factor table with a value of the parameter specified in a segment to be processed as an interpolation factor, thereby calculating an interpolated value of the internal division factor corresponding to the specified value of the parameter; and performing an internal division operation on a plurality of control points defining shape of the segment to be processed at a ratio based on the interpolated value of the internal division factor, thereby calculating a vertex coordinate on the parametric curve corresponding to the specified value of the parameter in the segment to be processed.

Yet another embodiment of the present invention is also a tessellation method. This tessellation method is one for subdividing a parametric surface represented by coordinate points associated with a pair of parameters into polygon meshes. The method comprises: storing in advance an initial value and a final value of a first internal division factor at both ends of a domain of a first parameter in a two-dimensional parametric coordinate system defined for each of patches, or component units, of the parametric surface into a factor table, the first internal division factor having a value depending on the first parameter, and interpolating the initial value and the final value of the first internal division factor stored in the factor table with a value of the first parameter specified in a patch to be processed as an interpolation factor, thereby calculating an interpolated value of the first internal division factor corresponding to the specified value of the first parameter; and performing an internal division operation on a plurality of control points defining shape of the patch to be processed in an axial direction of the first parameter in the two-dimensional parametric coordinate system at a ratio based on the interpolated value of the first internal division factor.

Incidentally, any combinations of the foregoing components, and any conversions of expressions of the present invention from/into methods, apparatuses, systems, computer programs, data structures, and the like are also intended to constitute applicable embodiments of the present invention.

BRIEF DESCRIPTION OF THE DRAWINGS

FIGS. 2A and 2B are diagrams for explaining square primitives to be input to the rasterizer of FIG. 1;

FIGS. 12A to 12J are diagrams schematically showing the steps for determining a point on a parametric surface corresponding to two-dimensional parametric coordinate values, and tangents at that point;

FIG. 15 is a chart summarizing the connection relationship between segments for the respective types of knot patterns;

FIG. 17 is a diagram for explaining the process of calculating the B-spline basis functions of a B-spline curve having the order of 4 and the number of control points of 4, by using recurrence formulas;

FIG. 18 is a chart showing the process of calculation of FIG. 17, modified by using blending factors; and FIG. 19 is a chart summarizing the internal division factors for the respective types of knot patterns.

DETAILED DESCRIPTION OF THE INVENTION

Figure 1:
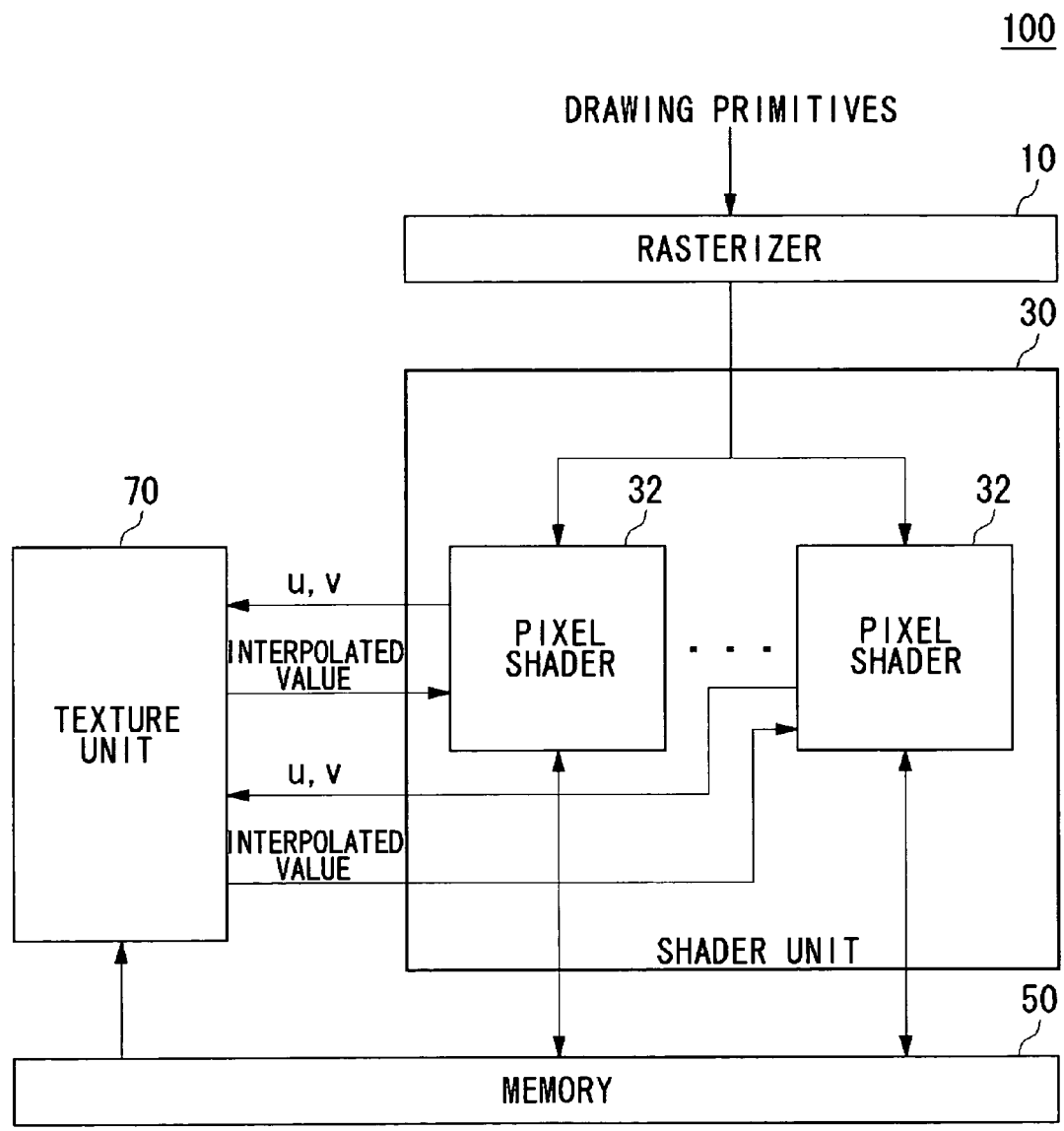
FIG. 1 is a block diagram of a drawing processing apparatus according to an embodiment.

FIG. 1 is a block diagram of a drawing processing apparatus 100 according to an embodiment. The drawing processing apparatus 100 performs rendering processing for generating drawing data to be displayed on a two-dimensional screen based on three-dimensional model information.

In particular, the drawing processing apparatus 100 of the present embodiment performs tessellation processing for subdividing an object to be drawn, modeled with a free-form surface, into a set of geometric primitives. Initially, the configuration of the drawing processing apparatus 100 will be described along with typical operations thereof. Subsequently, description will be given of the operations pertaining to the tessellation processing, characteristic to the present embodiment.

A rasterizer 10 acquires vertex data on primitives to be drawn from a memory, another processor, a vertex shader, or the like, and converts the data into pixel information corresponding to an intended drawing screen. Drawing primitives are geometric units of drawing when rendering a three-dimensional object into a polygonal model, such as points, lines, triangles, and rectangles. The data on drawing primitives is expressed in units of vertexes. The rasterizer 10 performs view transformation for transforming drawing primitives in three-dimensional space into figures on the drawing plane through projection transform. The rasterizer 10 also scans the figures on the drawing plane in the horizontal direction of the drawing plane while converting them into quantized pixels row by row.

In the rasterizer 10, drawing primitives are developed into pixels, and pixel information is calculated for each of the pixels. The pixel information includes color values expressed in three primary colors RGB, an alpha ($\alpha$) value for indicating transparency, a Z value for indicating a depth, and UV coordinate values or parametric coordinates for making reference to texture attributes.

The rasterizer 10 performs the foregoing rasterization processing in units of pixel sets of a predetermined size, each including one or more pixels. The rasterizer 10 buffers rasterized pixel sets while supplying them to a shader unit 30 set by set. The pixel sets supplied from the rasterizer 10 to the shader unit 30 are subjected to pipeline processing in the shader unit 30. Pixel sets are a collection of pixels for the rasterizer 10 to process at a time. They are the units for rasterization processing, and the units for drawing processing in the shader unit 30 as well.

The shader unit 30 includes a plurality of pixel shaders 32 which make asynchronous operations. The pixel shaders 32 process respective pixel sets they are in charge of, thereby performing pixel drawing processing in parallel. The pixel shaders 32 each perform shading processing to determine the color values of the pixels based on the pixel information which is assigned from the rasterizer 10 in units of the pixel sets. When texture mapping is required, the pixel shaders 32 synthesize color values of textures acquired from a texture unit 70 to calculate the final color values of the pixels, and write the pixel data to a memory 50.

The texture unit 70 maps texture data to pixels to be processed in each of the pixel shaders 32.

The positions of textures mapped to the pixels on a polygon surface are represented by two-dimensional parametric coordinates, or a UV coordinate system. The texture unit 70 acquires the coordinate values (u, v) of textures to be mapped to the pixels from the pixel shaders 32, interpolates the color values corresponding to the coordinate values (u, v), and supplies the interpolated values to the respective pixel shaders 32.

The pixel shaders 32 also apply such processing as fogging and alpha-blending to the drawing data retained in the memory 50, thereby determining the final color values of the pixels and updating the pixel data in the memory 50.

The memory 50 has an area that functions as a frame buffer for storing pixel data generated by the pixel shaders 32 in association with screen coordinates. The pixel data stored in the frame buffer may be either that of a final drawing image or that of an intermediate image in the process of shading. The pixel data stored in the frame buffer is output to and displayed on a display unit.

Next, description will be given of operations of the individual components of the drawing processing apparatus 100, pertaining to the tessellation processing.

The rasterizer 10 receives input of drawing primitives each having a square shape (hereinafter, referred to simply as square primitive). Square primitives have two vertexes, or the ends of a diagonal of a square, as parameters. The rasterizer 10 generates two-dimensional parametric coordinate values (u, v) defined for patches, or minimum component units of a parametric surface, within the square primitives pixel by pixel by utilizing the function of the rasterization processing of converting a square primitive into pixel data.

The rasterizer 10 also determines indexes for consulting control point data which defines the shape of the patches of the parametric surface, and the types of knot patterns to be described later which are used in the u and v directions of the patches, respectively. The resultants are supplied to the pixel shaders 32 of the shader unit 30 as parameter information along with the two-dimensional parametric coordinate values (u, v) in the patches.

FIGS. 2A and 2B are diagrams for explaining square primitives to be input to the rasterizer 10. FIG. 2A shows square primitives 200 to 203 of uniform size to be input to the rasterizer 10. The square primitives 200 to 203 each have four rows and four columns of pixel sets each containing a 4×4 matrix of pixels. That is, each of the square primitives has a drawing area of 16×16 pixels or a total of 256 pixels each. In this case, the rasterizer 10 subdivides each of the square primitives into 16 rows and 16 columns or a total of 256 ways each, and generates two-dimensional parametric coordinate values in succession.

As in FIG. 2A, when the rasterizer 10 receives input of the square primitives 200 to 203 of the same size with respect to an object to be drawn, the dividing granularity of the free-form surface of the object to be drawn is constant. The free-form surface is thus subdivided uniformly. For adaptive tessellation where the granularity for subdividing the free-form surface of a drawing object is adjusted depending on the situation, the sizes of the square primitives are changed when input to the rasterizer 10.

FIG. 2B is a diagram for explaining square primitives to be input to the rasterizer 10 for adaptive tessellation. Square primitives 210 and 211, with two rows and two columns of pixel sets each containing a 4×4 matrix of pixels, have a drawing area of 8×8 pixels or a total of 64 pixels. Here, the rasterizer 10 subdivides each of the square primitives into 8 rows and 8 columns or a total of 64 ways each, and generates two-dimensional parametric coordinate values in succession.

Meanwhile, a square primitive 212, with five rows and five columns of pixel sets each containing a 4×4 matrix of pixels, has a drawing area of 20×20 pixels or a total of 400 pixels. Here, the rasterizer 10 subdivides this square primitive into 20 rows and 20 columns, or a total of 400 ways, and generates two-dimensional parametric coordinate values in succession.

A square primitive 213, having four rows and four columns of pixel sets each containing a 4×4 matrix of pixels, is subdivided into a 16 rows and 16 columns or a total of 256 ways as described in FIG. 2A.

As seen above, the greater sizes the square primitives have, the higher the numbers of divisions are and the more finely the same drawing areas are subdivided. For example, the higher the level of detail for drawing a drawing object at is, the greater sizes the square primitives may be given for the sake of a larger number of divisions. The sizes of the square primitives may also be adjusted to change the number of divisions according to the relationship between the normal directions of the patches and the view direction. Moreover, when the drawing object has a complicated shape, the sizes of the square primitives can be increased for a larger number of divisions. In this way, the sizes of the square primitives may be adjusted depending on the situation, thereby allowing adaptive tessellation processing.

Moreover, parameters for specifying a square primitive can also be adjusted so that a range narrower than the original square area is selected for tessellation processing. With a square primitive, the parameters for specifying the vertexes at both ends of a diagonal of the area can be adjusted to limit the drawing area. The vertex parameters at both ends of a diagonal of a square area are (0, 0) and (1, 1), which may be changed into values of between 0 and 1 to narrow the drawing area. As shown by the reference numeral 214, when vertexes (0.25, 0.3) and (0.5, 0.9) are specified, the drawing area of the square primitive can be narrowed to an oblong area that is defined by the diagonal connecting these vertexes. The vertex parameters at both ends of the diagonals for defining drawing areas can thus be adjusted to limit the drawing areas to oblong shapes even if square primitives are input to the rasterizer 10. This makes it possible to create a surface with arbitrary rectangular areas.

Before discussing the concrete configuration and operation of the shader unit 30 and the texture unit 70 intended for the tessellation processing, an overview will first be given of the steps of the tessellation processing.

Free-form surfaces for rendering three-dimensional objects are classified into several types including Bezier surfaces and B-spline surfaces. NURBS (Non Uniform Rational B-Spline) surfaces are used widely as a more general rendering mode of free-form surfaces. These surfaces are parametric surfaces having two parameters u and v. On the surfaces, points (x, y, z) are defined continuously with respect to the two parameters (u, v). When an object is modeled with a parametric surface, minimum component units of the parametric surface, called patches, are connected to express the single surface.

The present embodiment will deal with the case where a NURBS surface, having high design flexibility, is used as the parametric surface. The same tessellation processing can also be achieved, however, even with other types of free-form surfaces.

Figure 3:
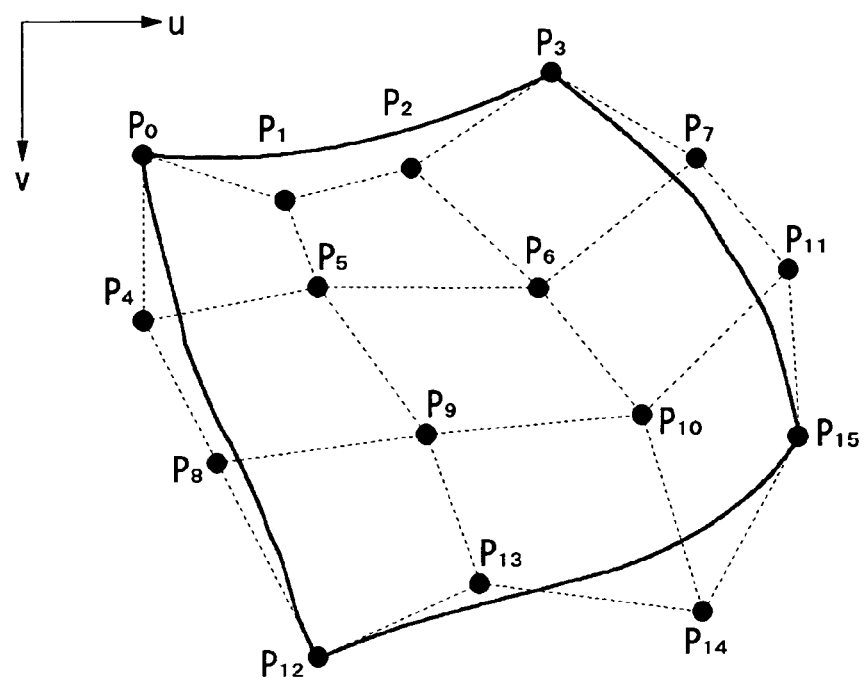
FIG. 3 is a diagram for explaining a patch, or a minimum component unit of a parametric surface.

FIG. 3 is a diagram for explaining patches, the minimum component units of a parametric surface. Patches are defined within the range of $0 \leq u \leq 1$ and $0 \leq v \leq 1$. A B-spline surface of order four has a 4×4 matrix of control points arranged in the u direction and v direction, or a total of 16 control points $P_0$ to $P_{15}$. When viewed in the u direction or v direction, this parametric surface can be regarded as a parametric curve with a parameter u or v. The minimum units of a parametric curve are called segments. A B-spline curve of order four has four control points.

In tessellation processing, the two-dimensional parametric coordinate values (u, v) are changed at predetermined pitches with respect to each of the patches of the parametric surface, so that points on the parametric surface corresponding to the respective two-dimensional parametric coordinate values (u, v) are determined as the vertex coordinates of the primitives. By this tessellation processing, the free-form surface of the object to be drawn is subdivided into meshes patch by patch, and converted into a set of smaller primitives.

To determine a point on the parametric surface corresponding to two-dimensional parametric coordinate values (u, v), the parametric surface is initially viewed in the u direction to determine the point on the parametric curve corresponding to the first parametric coordinate value u. Next, the parametric surface is viewed in the v direction to determine the point on the parametric curve corresponding to the second parametric coordinate value v.

Figure 4A:
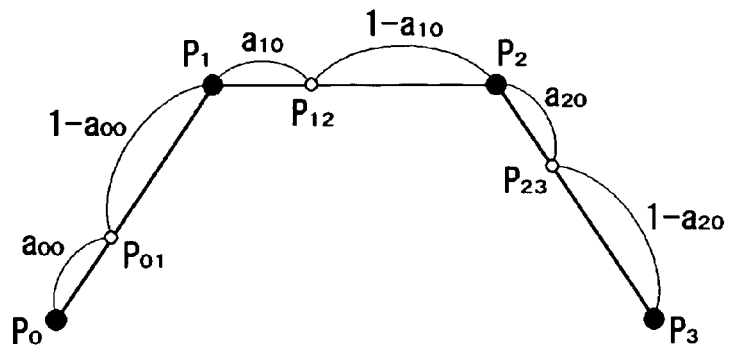
FIGS. 4A to 4C are diagrams for explaining the steps for determining a point on a parametric curve.
Figure 4B:
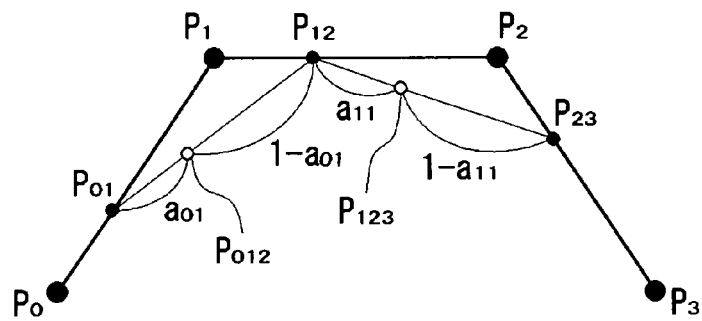
Figure 4C:
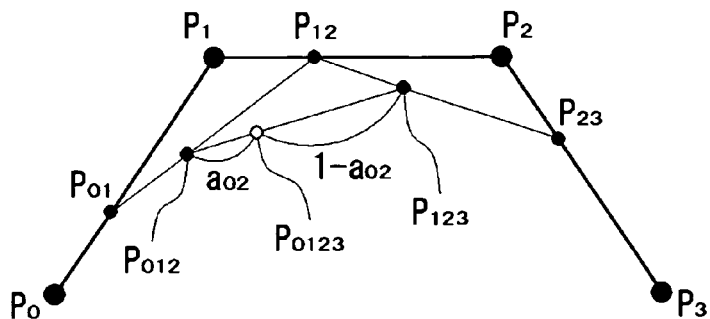

FIGS. 4A to 4C are diagrams for explaining the steps for determining a point on a parametric curve. Since the same steps apply to both the u direction and the v direction, a parameter t will be assumed for description purpose, without distinction between the first parameter u and the second parameter v of the two-dimensional parametric coordinate system.

In the segment of the parametric curve, a point corresponding to the parameter t is determined by performing an internal division operation on the four control points $P_0$ to $P_3$, which define the shape of the segment, three times recursively by using internal division factors that are dependent on the parameter t.

In the first internal division operation, as shown in FIG. 4A, a point $P_{01}$ is determined which divides the first and second control points $P_0$ and $P_1$ internally at a ratio of $a_{00}:(1-a_{00})$ based on an internal division factor $a_{00}$ corresponding to the parameter t. Similarly, a point $P_{12}$ is determined which divides the second and third control points $P_1$ and $P_2$ internally at a ratio of $a_{10}:(1-a_{10})$ based on an internal division factor $a_{10}$. A point $P_{23}$ is determined which divides the third and fourth control points $P_2$ and $P_3$ internally at a ratio of $a_{20}:(1-a_{20})$ based on an internal division factor $a_{20}$. The three internal division factors $a_{00}$, $a_{10}$, and $a_{20}$ used in the first internal division operation will be referred to as first internal division factors.

Next, in the second internal division operation, as shown in FIG. 4B, a point $P_{012}$ is determined which further divides the first and second internally dividing points $P_{01}$ and $P_{12}$ determined in FIG. 4A internally at a ratio of $a_{01}:(1-a_{01})$ based on an internal division factor $a_{01}$ corresponding to the parameter t. Similarly, a point $P_{123}$ is determined which further divides the second and third internally dividing points $P_{12}$ and $P_{23}$ determined in FIG. 4A internally at a ratio of $a_{11}:(1-a_{11})$ based on an internal division factor $a_{11}$. The two internal division factors $a_{01}$ and $a_{11}$ used in the second interpolating operation will be referred to as second internal division factors.

Finally, in the third internal division operation, as shown in FIG. 4C, a point $P_{0123}$ is determined which further divides the first and second internally dividing points $P_{012}$ and $P_{123}$ determined in FIG. 4B internally at a ratio of $a_{02}:(1-a_{02})$ based on an internal division factor $a_{02}$ corresponding to the parameter t. The internal division factor $a_{02}$ used in the third internal division operation will be referred to as a third internal division factor.

The point $P_{0123}$ determined thus by dividing the four control points internally three times recursively falls on the parametric curve corresponding to the parameter t.

Figure 5:
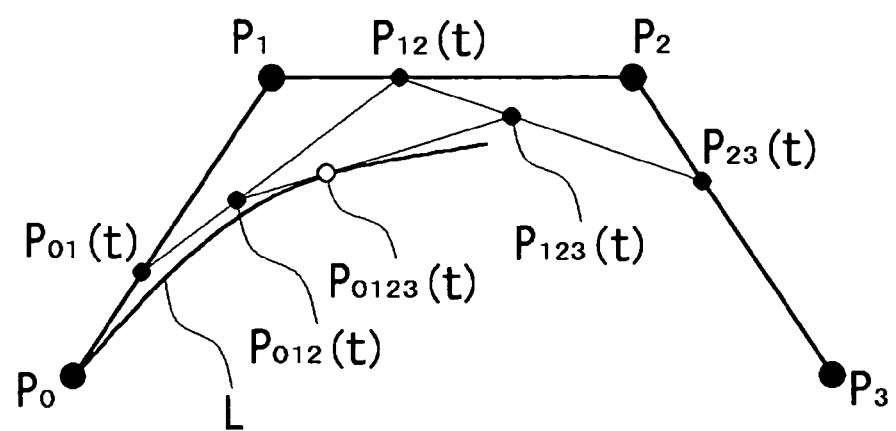
FIG. 5 is a diagram showing how the point on the parametric curve is determined by repeating internal divisions on four control points.

FIG. 5 is a diagram showing how the point $P_{0123}$ on the parametric curve is determined by repeating internal division of the four control points $P_0$ to $P_3$. $P_{01}(t)$, $P_{12}(t)$, and $P_{23}(t)$ are the points that divide the four control points $P_0$ to $P_3$ internally with the respective first internal division factors corresponding to the parameter t. $P_{012}(t)$ and $P_{123}(t)$ are the points that further divide the foregoing points internally with the respective second internal division factors corresponding to the parameter t. $P_{0123}(t)$ is the point that divides the foregoing points internally with the third internal division factor corresponding to the parameter t. When the parameter t is changed, $P_{0123}(t)$ traces the parametric curve L. Incidentally, the tangent to the parametric curve L at the point $P_{0123}(t)$ is given by a difference vector between the two points $P_{012}(t)$ and $P_{123}(t)$.

The tessellation processing is performed by changing the parameter t in predetermined small pitches while internally dividing the four control points three times recursively by using the internal division factors corresponding to the parameter t, thereby determining the point $P_{0123}(t)$. When points $P_{0123}(t)$ corresponding to the parameter t varying at the predetermined pitches are connected with lines in succession, the parametric curve within the single segment is approximated by the lines. This processing can be performed in both the u direction and the v direction, so that the parametric surface within the single patch is subdivided into meshes or a tessellation result of a predetermined number of divisions.

Figure 6:
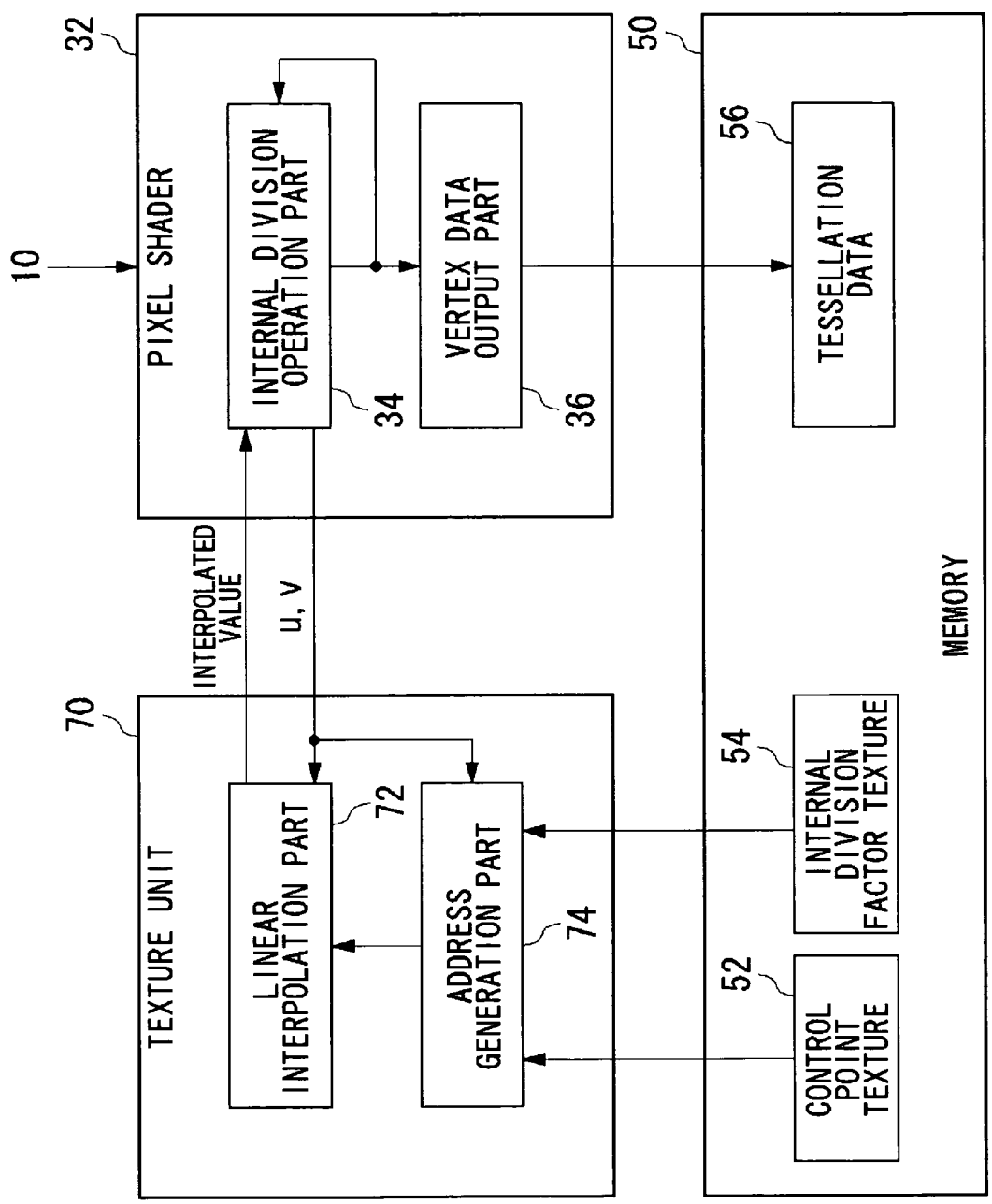
FIG. 6 is a diagram showing the configuration of a pixel shader and the texture unit of FIG. 1, intended for tessellation processing.

FIG. 6 is a diagram showing the configuration of the pixel shaders 32 and the texture unit 70 for performing the tessellation processing. For ease of explanation, FIG. 6 shows only a single pixel shader 32 representatively. The following description will also deal with the single pixel shader 32 alone, whereas the same holds for the rest of the pixel shaders 32.

The pixel shader 32 performs the processing of applying a patch of a parametric surface to the square primitive assigned from the rasterizer 10, and subdividing the shape of the object to be drawn into meshes by patch. The pixel shader 32 divides the patch into meshes by determining the points on the parametric surface corresponding to two-dimensional parametric coordinate values (u, v) generated by the rasterizer 10, as the vertex coordinates of the meshes. For the sake of this calculation, the pixel shader 32 requires control points that define the shape of the patch, and data on the internal division factors that are used when performing an internal division operation on the control points recursively.

As will be detailed later, the internal division factor to be used when internally dividing the control points in the u direction is given by a linear expression of the first parameter u in the two-dimensional parametric coordinate system. The internal division factor to be used when internally dividing the control points in the v direction is given by a linear expression of the second parameter v in the two-dimensional parametric coordinate system.

Suppose that both the first parameter u and the second parameter v are represented by t without distinction. The value of an internal division factor corresponding to the parameter t is determined by dividing its values at both ends of an interval $0 \leq t \leq 1$, or an initial value at $t=0$ and a final value at $t=1$, internally at a ratio of $t:(1-t)$ based on the parameter t. That is, the value of the internal division factor corresponding to any t can be determined if the initial value and the final value are given.

This characteristic has an affinity for a linear interpolation function of the texture unit 70. Handling the initial values and final values of internal division factors as texture data, the texture unit 70 can make linear interpolation between the initial values and final values of the internal division factors with the parameter t as an interpolation factor. The internal division factors for an arbitrary parameter t can thus be obtained by utilizing the texture interpolation. This is advantageous in terms of memory capacity and calculation cost as compared to such methods that a table containing a list of internal division factors for various values of the parameter t is prepared and that the internal division factors are calculated based on their linear expressions. Then, in the present embodiment, only the initial values and final values of the internal division factors are stored as texture data in an internal division factor texture 54.

The pixel shader 32 also performs an internal division operation on the control points defining the shape of the patch recursively by using ratios based on the internal division factors. This internal division operation also has an affinity for the linear interpolation function of the texture unit 70. Handling the coordinate values of the control points as texture data, the texture unit 70 can make linear interpolation between two control points by using an internal division factor as the interpolation factor. The points internally divided on the basis of the internal division factors can thus be obtained by utilizing the texture interpolation. Then, in the present embodiment, the first internal division operation out of the recursive internal division operations on the control points is performed by using the linear interpolation function of the texture unit 70. For that purpose, the control point data is stored as texture data in a control point texture 52.

An internal division operation part 34 of the pixel shader 32 issues a texture load instruction to the texture unit 70, specifying two-dimensional parametric coordinate values (u, v) on the patch of the parametric surface as interpolation factors. The internal division operation part 34 thereby acquires from the texture unit 70 internal division factors that are interpolated based on the two-dimensional parametric coordinate values (u, v). When issuing this texture load instruction, the internal division operation part 34 also specifies the types of knot patterns to be applied to that patch. The types of knot patterns are required when the texture unit 70 determines which row of the internal division factor texture 54 to refer to.

The internal division operation part 34 also issues a texture load instruction to the texture unit 70, specifying the internal division factors acquired from the texture unit 70 as new interpolation factors. The internal division operation part 34 thereby acquires from the texture unit 70 control points that are interpolated based the internal division factors. When issuing this texture load instruction, the internal division operation part 34 also specifies the index of control point data to be applied to that patch. This index is required when the texture unit 70 determines which row of the control point texture 52 to refer to.

The internal division operation part 34 performs an internal division operation on the control points acquired from the texture unit 70 recursively based on the internal division factors corresponding to the two-dimensional parametric coordinate values (u, v). As a result, the point on the parametric surface corresponding to the two-dimensional parametric coordinate values (u, v) is determined as vertex coordinates of a mesh. For the sake of the recursive internal division operation, the internal division operation part 34 has a register for holding intermediate calculations. It writes intermediate calculations of an operation to the register once, and then reads the intermediate calculations from the register for a further operation.

A vertex data output part 36 writes the vertex coordinate values of a mesh of the parametric surface determined by the internal division operation part 34 to the memory 50 in association with the two-dimensional parametric coordinate values (u, v). That is, the internal division operation part 34 changes the two-dimensional parametric coordinate values (u, v) at predetermined pitches while it determines the vertex coordinate values of the meshes on the parametric surface. The vertex data output part 36 writes the vertex coordinate values to the memory 50 in association with the two dimensional parametric coordinate values (u, v). Consequently, data on the parametric surface in the patch, subdivided in meshes, is formed inside the memory 50 as tessellation data 56.

The texture unit 70 receives two-dimensional parametric coordinate values (u, v) from the pixel shader 32 as interpolation factors, interpolates internal division factors read from the internal division factor texture 54 by using the interpolation factors, and supplies the interpolated values to the pixel shader 32. The texture unit 70 also receives internal division factors from the pixel shader 32 as interpolation factors, interpolates control points read from the control point texture 52 by using the interpolation factors, and supplies the interpolated values to the pixel shader 32.

The control point texture 52 and the internal division factor texture 54 consulted by the texture unit 70 store control points and internal division factors in the form of a texture, respectively. The texture unit 70 performs linear interpolation on the control points and the internal division factors with specified interpolation factors by utilizing its function of reading texel values from texture data and performing linear interpolation thereon by using a linear interpolator.

Figure 7:
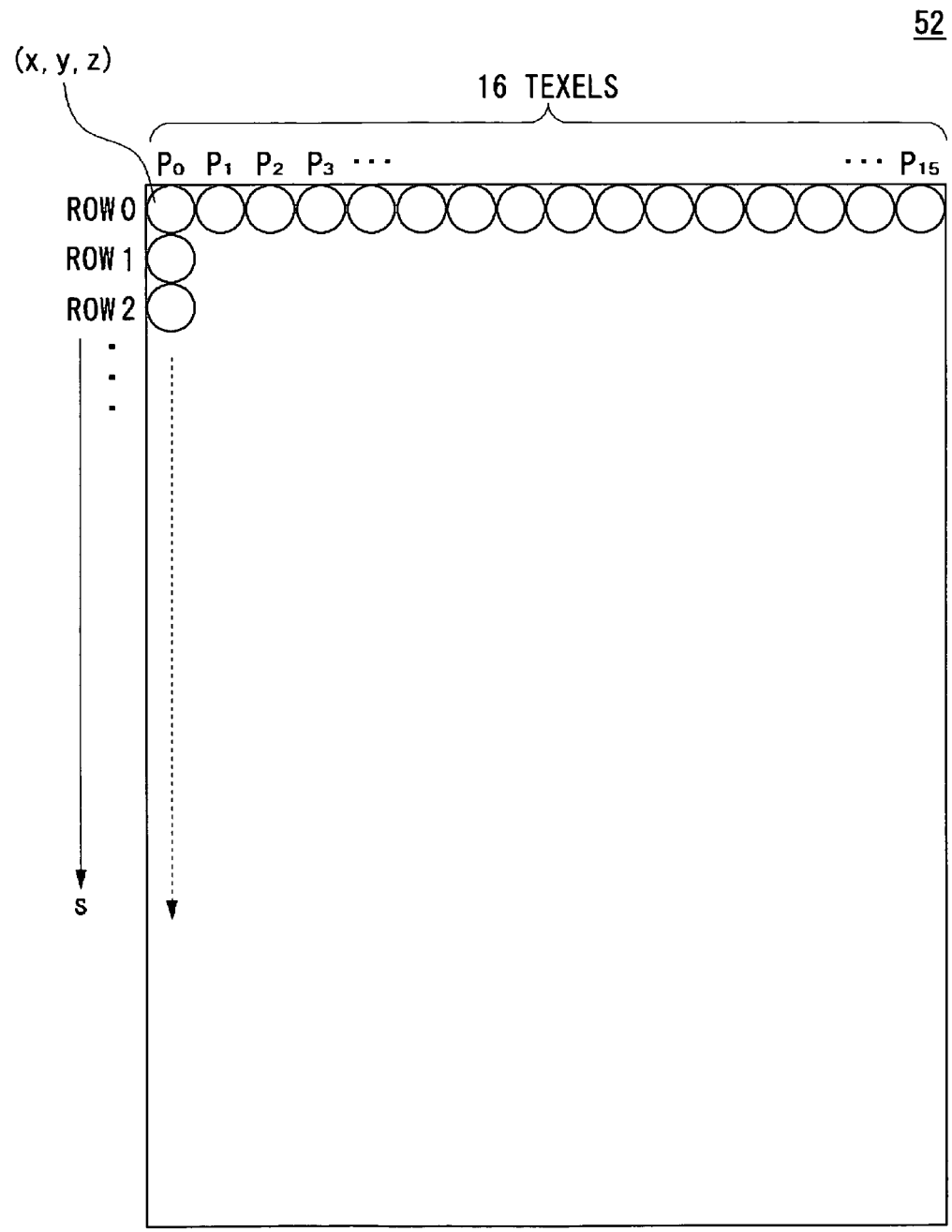
FIG. 7 is a diagram for explaining the data structure of a control point texture of FIG. 6.

FIG. 7 is a diagram for explaining the data structure of the control point texture 52. The control point texture 52 has the data structure such that 16 control points for defining the shape of patches of a parametric surface are stored as a row of texel values. Each row contains the three-dimensional coordinate values (x, y, z) of 16 control points $P_0$ to $P_{15}$. The 16 control points $P_0$ to $P_{15}$ in each single horizontal row are used as control points on a single patch surface. In the vertical direction, as many pieces of control point data as the number of patch surfaces on the object to be drawn are prepared.

Textures typically contain texel values each consisting of three color values RGB. Here, the coordinate values x, y, and z of the control points are stored instead of the R, G, B values in the texels, respectively, so that the texture data structure is utilized to store the three-dimensional coordinates of the control points.

The texture unit 70 reads the three-dimensional coordinate values of control points from the control point texture 52 by specifying a reference address which is based on a line number S and a control point number i (i=0, 1, . . . , 15) of the control point texture 52.

Figure 8:
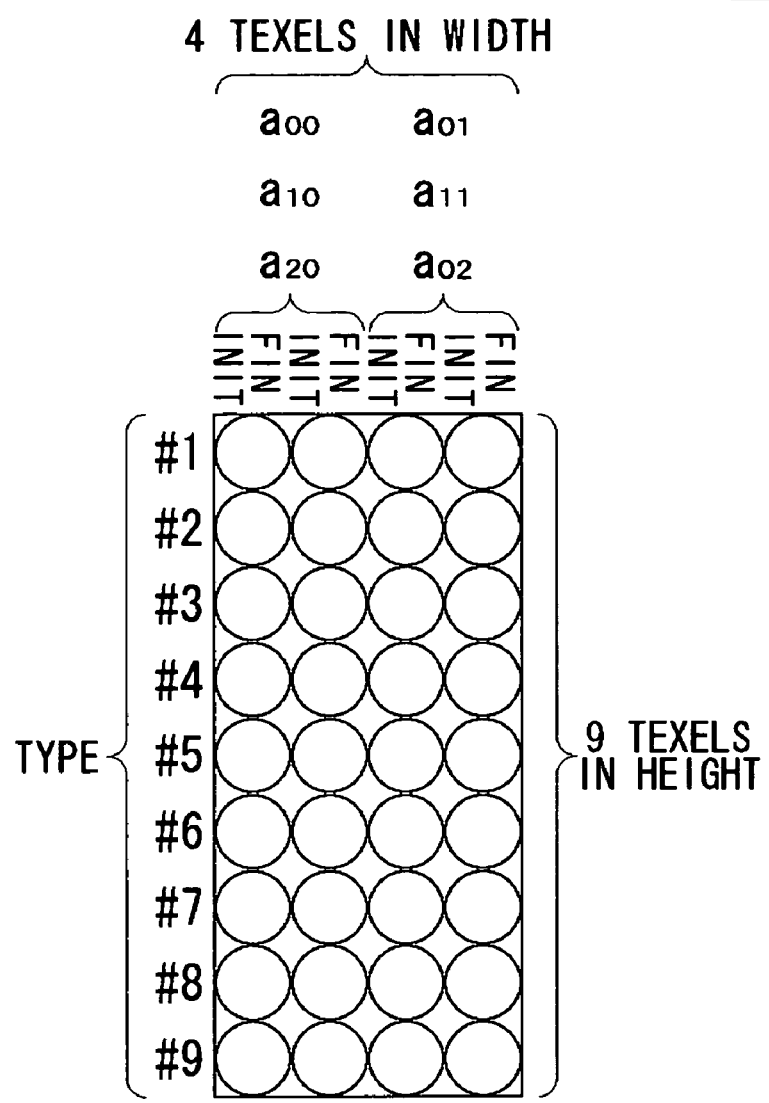
FIG. 8 is a diagram for explaining the data structure of an internal division factor texture of FIG. 6.

FIG. 8 is a diagram for explaining the data structure of the internal division factor texture 54. The internal division factor texture 54 has the data structure such that the initial values and final values of the first, second, and third internal division factors for use in recursive internal division operations on control points are stored as texel values with respect to each of the knot patterns of the patches on a NURBS surface.

As will be detailed later, in the present embodiment, the knot patterns are limited to nine in number, in consideration of smooth connectivity between adjoining patches of a NURBS surface. The rows of the internal division factor texture 54 correspond to types #1 to #9 of knot patterns, respectively. Each row contains the internal division factors of that type of knot pattern in the form of four texels.

The first texel contains, as its texel values, the initial values of the first internal division factors $a_{00}$, $a_{10}$, and $a_{20}$ for use in the first internal division operation ($a_{00}(0)$ $a_{10}(0)$, $a_{20}(0)$) instead of color values (R, G, B). The second texel contains the final values of the first internal division factors $a_{00}$, $a_{10}$, and $a_{20}$ for use in the first internal division operation ($a_{00}(1)$, $a_{10}(1)$, $a_{20}(1)$).

The third texel contains, as its texel values, a combination of the initial values of the second internal division factors $a_{01}$ and $a_{11}$ for use in the second internal division operation and the initial value of the third internal division factor $a_{02}$ for use in the third internal division operation ($a_{01}(0)$, $a_{11}(0)$, $a_{02}(0)$) instead of color values (R, G, B). The fourth texel contains a combination of the final values of the second internal division factors $a_{01}$ and $a_{11}$ for use in the second internal division operation and the final value of the third internal division factor $a_{02}$ for use in the third internal division operation ($a_{00}(1)$, $a_{11}(1)$, $a_{02}(1)$).

The texture unit 70 reads internal division factors from the internal division factor texture 54 by specifying a reference address which is based on the type of the knot pattern in the vertical direction and the texel number in the horizontal direction.

Returning to FIG. 6, description will now be given of the operation in which an address generation part 74 and a linear interpolation part 72 of the texture unit 70 consult the internal division factor texture 54 and the control point texture 52 as texture data and perform linear interpolation on internal division factors and control points.

The address generation part 74 generates a reference address for consulting the internal division factor texture 54 based on the type of the knot pattern and the two-dimensional parametric coordinate values (u, v) specified by the internal division operation part 34 of the pixel shader 32. The address generation part 74 reads the initial values and final values of the internal division factors corresponding to the reference address from the internal division factor texture 54, and inputs the same to the linear interpolation part 72.

The linear interpolation part 72 is a linear interpolator having an adder, a subtracter, a multiplier, and a register for retaining an interpolation factor. The linear interpolator receives a first input value X, a second input value Y, and an interpolation factor A. The subtracter subtracts the first input value X from the second input value Y to calculate the difference between the two input values Y−X, and supplies it to the multiplier. The multiplier multiplies the difference Y−X input from the subtracter by the interpolation factor A to determine a value A(Y−X), and supplies it to the adder. The adder adds the product A(Y−X) input from the multiplier and the first input value X to determine a value A(Y−X)+X. The adder outputs the result as the final output value of the linear interpolator.

The output value Z of the linear interpolation part 72 can be modified as Z=A(Y−X)+X=(1−A)X+AY. The value is thus one determined by dividing the first input value X and the second input value Y internally at a ratio of A:(1−A) based on the interpolation factor A.

The linear interpolation part 72 performs linear interpolation between the initial values and final values of the respective internal division factors read by the address generation part 74, with the parametric coordinates u and v specified by the internal division operation part 34 as an interpolation factor each. The interpolated values of the internal division factors are supplied to the internal division operation part 34. Specifically, the linear interpolation part 72 outputs values $a_{ij}(t)=(1−t) \cdot a_{ij}(0)+t \cdot a_{ij}(1)$, which are determined by the linear interpolator interpolating the initial values $a_{ij}(0)$ and final values $a_{ij}(1)$ of the internal division factors $a_{ij}$ with the parameter t as the interpolation factor.

The internal division operation part 34 receives the interpolated values of the internal division factors from the linear interpolation part 72. The internal division operation part 34 then specifies the interpolated values of the internal division factors received as new interpolation factors, thereby requesting from the texture unit 70 the control points internally divided at ratios based on the interpolated values of the internal division factors. While it usually specifies two-dimensional parametric coordinate values (u, v) as interpolation factors and requests from the texture unit 70 texel values interpolated based on the two-dimensional parametric coordinate values (u, v), the internal division operation part 34 here utilizes the same interface and specifies the internal division factors as interpolation factors, instead of (u, v) values.

The address generation part 74 generates reference addresses for consulting the texture, based on the reference row of the control point data and the interpolation factors specified by the internal division operation part 34. The address generation part 74 reads the values of two control points corresponding to the reference addresses from the control point texture 52, and supplies the values to the linear interpolation part 72.

The linear interpolation part 72 performs linear interpolation between the two control points read by the address generation part 74, with the internal division factors specified by the internal division operation part 34 as interpolation factors. The interpolated values of the control points are supplied to the internal division operation part 34. Specifically, with the internal division factor $a_{ij}(t)$ corresponding to t as an interpolation factor, the linear interpolation part 72 outputs coordinate values determined by the linear interpolator interpolating the coordinate values $(x_A, y_A, z_A)$ of a first control point $P_A$ and the coordinate values $(x_B, y_B, z_B)$ of a second control point $P_B$, i.e., $(x_{AB}, y_{AB}, z_{AB})=(1−a_{ij}(t)) \cdot (x_A, y_A, z_A)+a_{ij}(t) \cdot (x_B, y_B, z_B)$.

Figure 9:
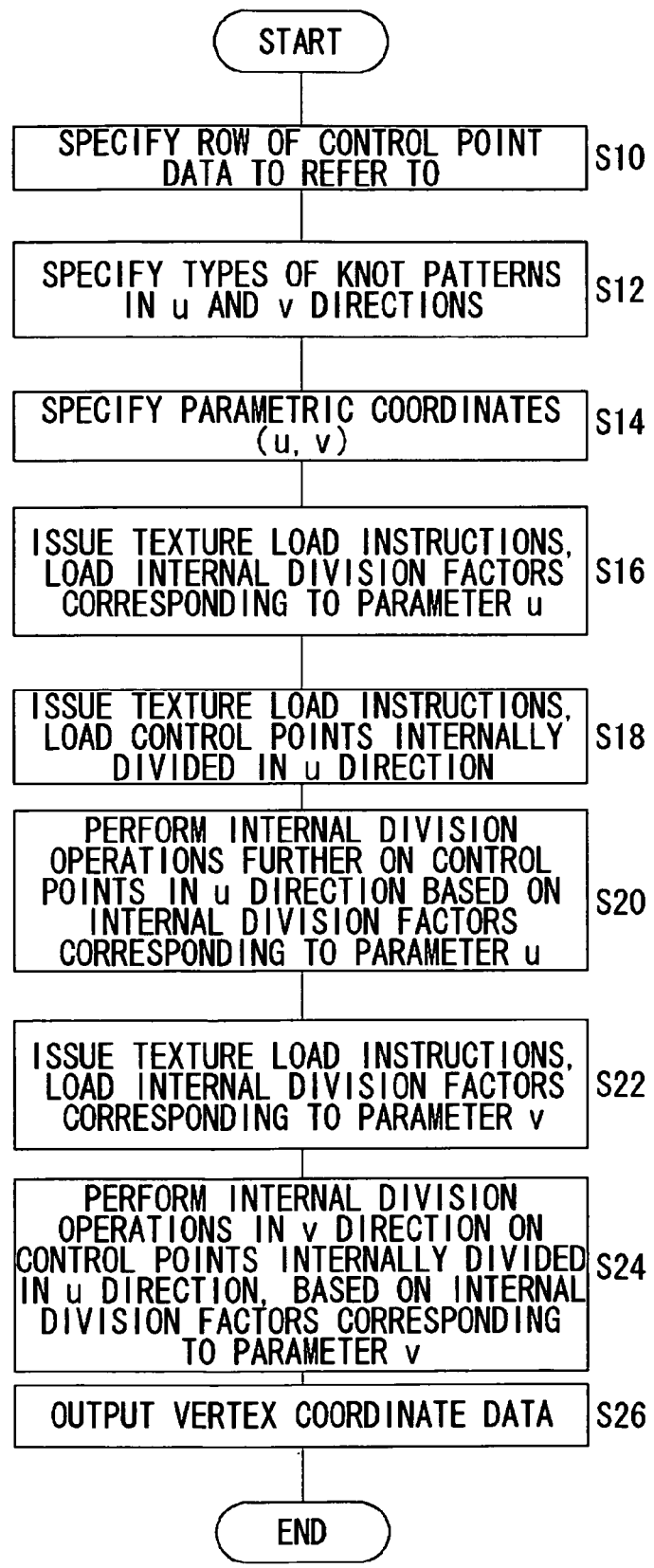
FIG. 9 is a flowchart for explaining the steps of tessellation processing by the pixel shader and the texture unit of FIG. 6.

FIG. 9 is a flowchart for explaining the steps of tessellation processing by the pixel shader 32 and the texture unit 70.

The pixel shader 32 receives parameter information on the patch to be processed from the rasterizer 10. More specifically, the pixel shader 32 receives data for specifying the reference row of the control point data to be used for this patch (S10), data for specifying the types of the knot patterns to be used in the respective u and v directions of the patch (S12), and data for specifying two-dimensional parametric coordinate values (u, v) with which the patch is divided at predetermined pitches (S14).

The internal division operation part 34 of the pixel shader 32 issues texture load instructions with the parameter u as the interpolation factor, thereby loading the interpolated values $a_{ij}(u)$ corresponding to the parameter u (S16). Receiving a texture load instruction from the internal division operation part 34, the texture unit 70 reads the initial values $a_{ij}(0)$ and final values $a_{ij}(1)$ of the internal division factors from the row of the internal division factor texture 54 corresponding to the type of the knot pattern in the u direction specified at step S12. The texture unit 70 divides the initial values $a_{ij}(0)$ and the final values $a_{ij}(1)$ internally at a ratio of u:1−u based on the parameter u, thereby determining interpolated values $a_{ij}(u)$ of the internal division factors corresponding to the parameter u. The interpolated values $a_{ij}(u)$ of the internal division factors are returned to the internal division operation part 34 as the result of the texture load instruction.

Figure 10:
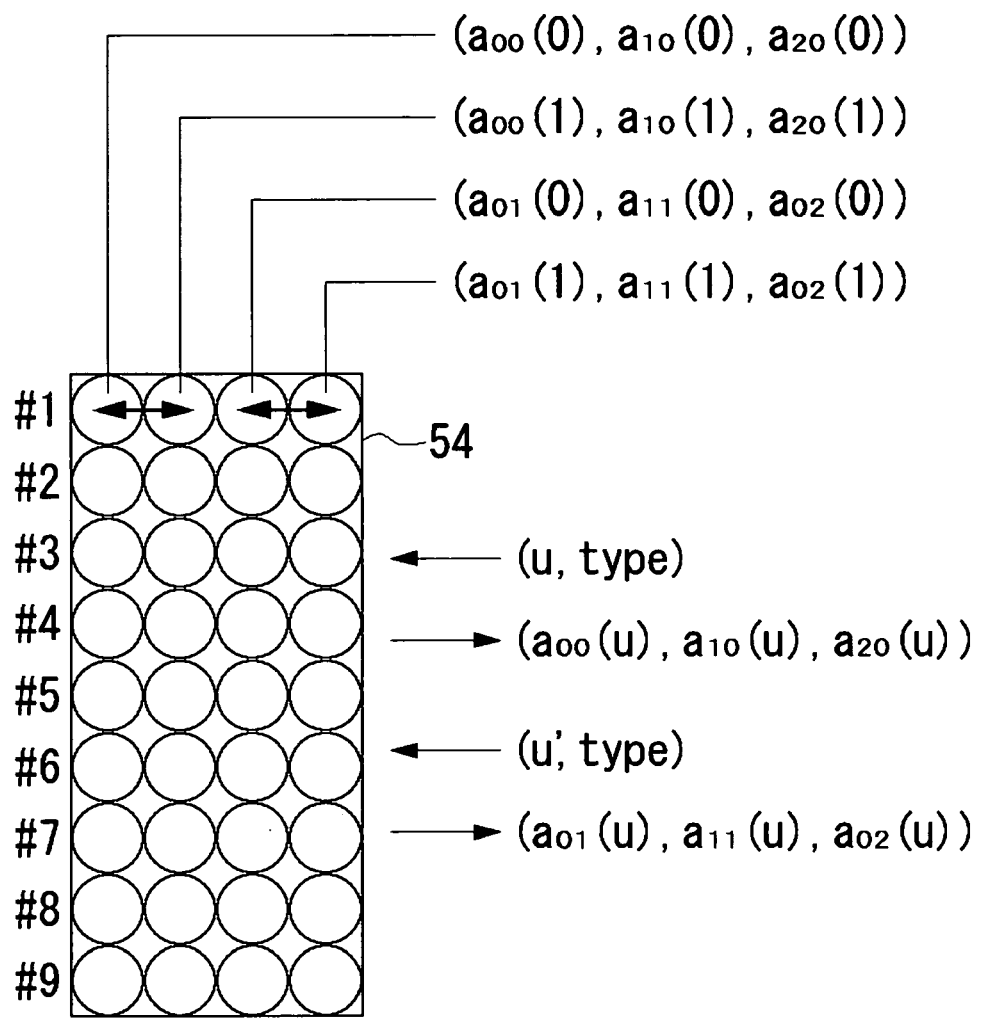
FIG. 10 is a diagram for explaining how interpolated values are determined from the initial and final values of internal division factors based on texture load instructions.

FIG. 10 is a diagram for explaining how interpolated values $a_{ij}(u)$ are determined from the initial values $a_{ij}(0)$ and final values $a_{ij}(1)$ of internal division factors in response to a texture load instruction. The internal division operation part 34 supplies (u, type) to the texture unit 70 as the parameters of a texture load instruction tld. Here, "type" represents the index to the type of the knot pattern, and corresponds to the reference row of the internal division factor texture 54.

The address generation part 74 generates the first address of the row of the internal division factor texture 54 specified by "type" as the reference address. The address generation part 74 then reads the first texel and the second texel of the corresponding row from the reference address, and supplies them to the linear interpolation part 72. Consequently, a group of initial values of the first internal division factors $(a_{00}(0), a_{10}(0), a_{20}(0))$ and a group of final values of the first internal division factors $(a_{00}(1), a_{10}(1), a_{20}(1))$ are input to the linear interpolation part 72.

The linear interpolation part 72 outputs values $(a_{00}(u), a_{10}(u), a_{20}(u))$ that are determined by dividing the initial values $(a_{00}(0), a_{10}(0), a_{20}(0))$ and the final values $(a_{00}(1), a_{10}(1), a_{20}(1))$ of the first internal division factors internally with the parameter u as the interpolation factor, or at a ratio of u:(1−u). The internal division operation part 34 acquires the interpolated values $(a_{00}(u), a_{10}(u), a_{20}(u))$ of the internal division factors corresponding to the specified parameter u as the return values of the texture load instruction tld.

Next, the internal division operation part 34 also supplies (u', type) as the parameters of the texture load instruction tld in order to acquire interpolated values of the second and third internal division factors corresponding to the parameter u. Here, u' has two texels of offset added to the value of u. This offset is required in order to skip the first and second texels in the row of the internal division factor texture 54 specified by "type", and perform linear interpolation between the third and fourth texels.

The address generation part 74 generates the reference address by adding two texels of offset to the first address of the row of the internal division factor texture 54 specified by "type". The address generation part 74 then reads the third and fourth texels of the corresponding row from the reference address, and supplies them to the linear interpolation part 72. Consequently, a group of initial values of the second and third internal division factors ($a_{01}(0)$, $a_{11}(0)$, $a_{02}(0)$) and a group of final values of the second and third internal division factors ($a_{00}(1)$, $a_{11}(1)$, $a_{02}(1)$) are input to the linear interpolation part 72.

The linear interpolation part 72 outputs values ($a_{01}(u)$, $a_{11}(u)$, $a_{02}(u)$) that are determined by dividing the initial values ($a_{01}(0)$, $a_{11}(0)$, $a_{02}(0)$) and the final values ($a_{01}(1)$, $a_{11}(2)$, $a_{02}(1)$) of the second and third internal division factors internally with the parameter u as the interpolation factor, or at a ratio of u:(1−u). The internal division operation part 34 acquires the interpolated values ($a_{01}(u)$, $a_{11}(u)$, $a_{02}(u)$) of the internal division factors corresponding to the specified parameter u as the return values of the texture load instruction tld.

The processing of step S16 can be written in pseudo-code as follows:

Load six factors interpolated in the u direction:

$tld(u, \text{type}) => a_{00}(u), a_{10}(u), a_{20}(u)$ $u+2 => u'$ $tld(u', \text{type}) => a_{01}(u), a_{11}(u), a_{02}(u)$ Here, "=>" indicates that the operation instruction on the left-hand side results in the right-hand side.

Returning to FIG. 9, the internal division operation part 34 issues a texture load instruction to load control points that are interpolated in the u direction at ratios based on the interpolated values $a_{00}(u)$, $a_{10}(u)$, and $a_{20}(u)$ of the first internal division factors acquired at step S16 (S18). In response to the issuance of the texture load instruction by the internal division operation part 34, the texture unit 70 acquires pairs of adjoining control points in succession out of the four control points in the specified reference row of the control point texture 52 in the u direction, and supplies them to the linear interpolation part 72. The linear interpolation part 72 divides the pairs of adjoining control points internally at internal division ratios based on the interpolated values $a_{00}(u)$, $a_{10}(u)$, and $a_{20}(u)$ of the first internal division factors. The control points divided internally are returned to the internal division operation part 34 as the result of the texture load instruction.

Figure 11:
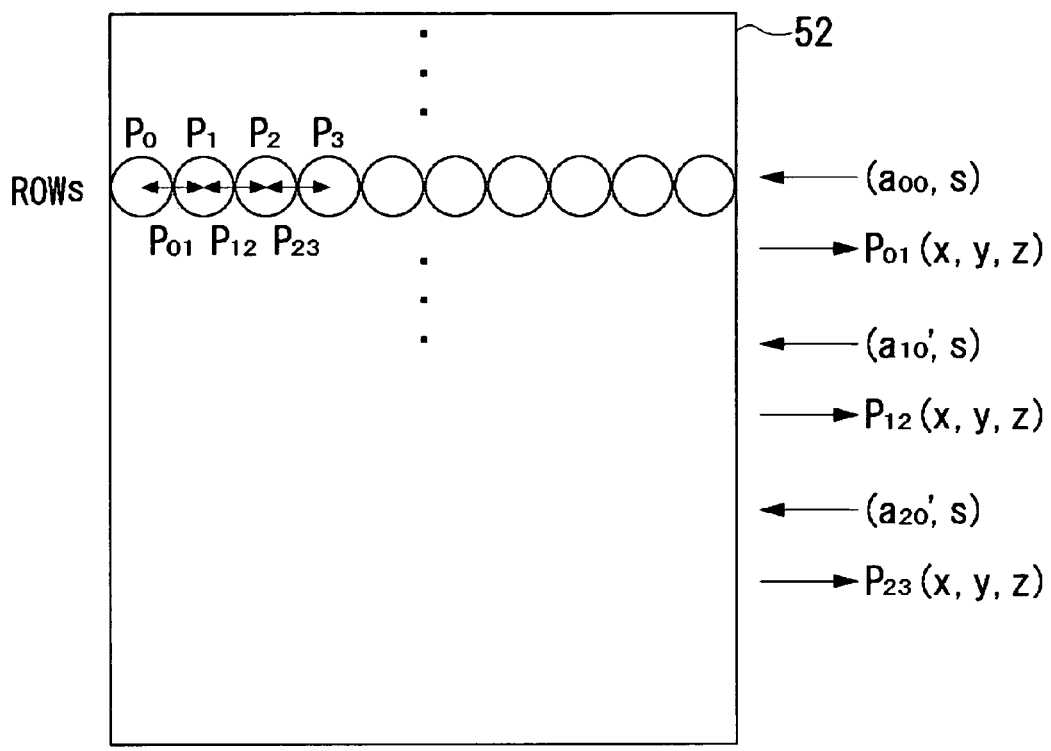
FIG. 11 is a diagram for explaining how control points are internally divided based on texture load instructions.

FIG. 11 is a diagram for explaining how control points are internally divided in response to a texture load instruction. Each row of the control point texture 52 contains data on 16 control points specified for a patch to be processed. Here, description will be given of the processing on four control points $P_0$ to $P_3$ in the u direction. The same processing applies to the other fours of the control points $P_4$ to $P_7$, $P_8$ to $P_{11}$, and $P_{12}$ to $P_{15}$ in the u direction when the texels to be read from the control point texture 52 are offset in units of four.

The first to fourth texels in the reference row s of the control point texture 52 contain the coordinate values of the four control points $P_0$ to $P_3$. The internal division operation part 34 supplies ($a_{00}$, s) to the texture unit 70 as the parameters of a texture load instruction tld.

The address generation part 74 generates the first address of the reference row s of the control point texture 52 as the reference address. The address generation part 74 then reads the first texel and the second texel of that row from the reference address, and supplies them to the linear interpolation part 72. As a result, the coordinate values of the first two adjoining control points $P_0$ and $P_1$ are input to the linear interpolation part 72.

The linear interpolation part 72 calculates and outputs the coordinate values of a point $P_{01}$ that divides the input two control points $P_0$ and $P_1$ internally at a ratio of $a_{00}:(1-a_{00})$ based on the first internal division factor $a_{00}$. The internal division operation part 34 acquires the coordinate values of the control point $P_{01}$ internally divided in advance at the internal division ratio based on the interpolated value $a_{00}(t)$ of the first internal division factor, as the return values of the texture load instruction tld.

Next, the internal division operation part 34 supplies ($a_{10}'$, s) to the texture unit 70 as the parameters of a texture load instruction tld. Here, $a_{10}'$ has a single texel of offset added to the value of $a_{10}$. This offset is required in order to skip the first texel in the reference row s of the control point texture 54, and make linear interpolation between the second and third texels.

The address generation part 74 generates the reference address by adding a single texel of offset to the first address of the reference row s of the control point texture 52. The address generation part 74 then reads the second and third texels of that row from the reference address, and supplies them to the linear interpolation part 72. As a result, the coordinate values of the next two adjoining control points $P_1$ and $P_2$ are input to the linear interpolation part 72.

The linear interpolation part 72 calculates and outputs the coordinate values of a point $P_{12}$ that divides the input two control points $P_1$ and $P_2$ internally at a ratio of $a_{10}:(1-a_{10})$ based on the first internal division factor $a_{10}$. The internal division operation part 34 acquires the coordinate values of the control point $P_{12}$ internally divided in advance at the internal division ratio based on the interpolated value $a_{10}(t)$ of the first internal division factor, as the return values of the texture load instruction tld.

Moreover, the internal division operation part 34 supplies ($a_{20}'$, s) to the texture unit 70 as the parameters of a texture load instruction tld. Here, $a_{20}'$ has two texels of offset added to the value of $a_{20}$. This offset is required in order to skip the first and second texels in the reference row s of the control point texture 54, and make linear interpolation between the third and fourth texels.

The address generation part 74 generates the reference address by adding two texels of offset to the first address of the reference row s of the control point texture 52. The address generation part 74 then reads the third and fourth texels of that row from the reference address, and supplies them to the linear interpolation part 72. As a result, the coordinate values of the subsequent two adjoining control points $P_2$ and $P_3$ are input to the linear interpolation part 72.

The linear interpolation part 72 calculates and outputs the coordinate values of a point $P_{23}$ that divides the input two control points $P_2$ and $P_3$ internally at a ratio of $a_{20}:(1-a_{20})$ based on the first internal division factor $a_{20}$. The internal division operation part 34 acquires the coordinate values of the control point $P_{23}$ internally divided in advance at the internal division ratio based on the interpolated value $a_{20}(t)$ of the first internal division factor, as the return values of the texture load instruction tld.

The processing of step S18 can be written in pseudo-code as follows:

Load three control points interpolated:

$tld(a_{00}, s) \Rightarrow P_{01}xyz$ $a_{10}+1 \rightarrow a_{10}'$ $tld(a_{10}', s) \Rightarrow P_{12}xyz$ $a_{20}+2 \rightarrow a_{20}'$ $tld(a_{20}', s) \Rightarrow P_{23}xyz$ Return now to FIG. 9. The internal division operation part 34 performs an internal division operation on the control points that are thus internally divided in advance, at ratios based on the interpolated values $a_{01}(u)$ and $a_{11}(u)$ of the second internal division factors in the u direction. The internal division operation part 34 performs an internal division operation further on the results at a ratio based on the interpolated value $a_{02}(u)$ of the third internal division factor in the u direction (S20). These internal division operations are performed by register-based computing in the internal division operation part 34. The internal division operation part 34 issues a store instruction st to write the result of the three internal division operations into the register.

The processing of step S20 can be written in pseudo-code as follows:

Calculate x-coordinate:

$P_{01}x+a_{01}(P_{12}x-P_{01}x) \Rightarrow P_{012}x$ $P_{12}x+a_{11}(P_{23}x-P_{12}x) \Rightarrow P_{123}x$ $P_{012}x+a_{02}(P_{123}x-P_{012}x) \Rightarrow P_{0123}x$ Calculate y-coordinate:

$P_{01}y+a_{01}(P_{12}y-P_{01}y) \Rightarrow P_{012}y$ $P_{12}y+a_{11}(P_{23}y-P_{12}y) \Rightarrow P_{123}y$ $P_{012}y+a_{02}(P_{123}y-P_{012}y) \Rightarrow P_{0123}y$ Calculate z-coordinate:

$P_{01}z+a_{01}(P_{12}z-P_{01}z) \Rightarrow P_{012}z$ $P_{12}z+a_{11}(P_{23}z-P_{12}z) \Rightarrow P_{123}z$ $P_{012}z+a_{02}(P_{123}z-P_{012}z) \Rightarrow P_{0123}z$ Store the coordinate values:

st $P_{0123}x$ st $P_{0123}y$ st $P_{0123}z$

Next, the internal division operation part 34 issues texture load instructions with the parameter v as the interpolation factor, thereby loading interpolated values $b_{ij}(v)$ of the first, second and third internal division factors corresponding to the parameter v (S22). As with the u direction, the texture unit 70, receiving a texture load instruction from the internal division operation part 34, reads the initial values $b_{ij}(0)$ and final values $b_{ij}(1)$ of the internal division factors from a row of the internal division factor texture 54 corresponding to the type of the knot pattern in the v direction specified at step S12. The texture unit 70 divides the initial values $b_{ij}(0)$ and the final values $b_{ij}(1)$ internally at a ratio of v:1−v based on the parameter v, thereby determining interpolated values $b_{ij}(v)$ of the internal division factors corresponding to the parameter v.

The interpolated values $b_{ij}(v)$ of the internal division factors are returned to the internal division operation part 34 as the result of the texture load instruction.

The operation of step S22 can be written in pseudo-code as follows:

Load six interpolated factors in the v direction:

$tld(v, \text{type}) \Rightarrow b_{00}(v), b_{10}(v), b_{20}(v)$ $v+2 \Rightarrow v'$ $tld(v', \text{type}) \Rightarrow b_{01}(v), b_{11}(v), b_{02}(v)$ The internal division operation part 34 issues a load instruction ld to read the control points internally divided three times recursively in the u direction from the register. The internal division operation part 34 then performs an internal division operation on the control points internally divided in the u direction, three times recursively in the v direction at ratios based on the interpolated values $b_{ij}(v)$ of the first, second, and third internal division factors determined at step S22 (S24). The internal division operations in the v direction are performed in the same manner as in the u direction. Note that while the first internal division operation in the u direction is performed by using the linear interpolation function of the texture unit 70, the three internal division operations in the v direction are $a_{11}$ performed in the internal division operation part 34 by holding intermediate calculations in the register.

In general, patches of a NURBS surface have different knot patterns in the u direction and in the v direction. The first, second, and third internal division factors $a_{ij}(u)$ for use in the internal division operations in the u direction and the first, second, and third internal division factors $b_{ij}(v)$ for use in the internal division operations in the v direction are thus independent of each other. That is, internal division factors corresponding to different types of knot patterns are used in the u direction and the v direction.

At step S24, the point on the parametric surface that corresponds to the two-dimensional parametric coordinate values (u, v) is determined finally. The internal division operation part 34 issues a store instruction st to store the determined point on the parametric surface into the register.

The processing of step S24 can be written in pseudo-code as follows:

Load four control points calculated in the u direction:

ld $P_0x$ ld $P_0y$ ld $P_0z$ ld $P_1x$ ld $P_1y$ ld $P_1z$ ld $P_2x$ ld $P_2y$ ld $P_2z$ ld $P_3x$ ld $P_3y$ ld $P_3z$

Calculate x-coordinate:

$P_0x+b_{00}(P_1x-P_0x) \Rightarrow P_{01}x$ $P_1x+b_{10}(P_2x-P_1x) \Rightarrow P_{12}x$ $P_2x+b_{20}(P_3x-P_2x) \Rightarrow P_{23}x$ $P_{01}x+b_{01}(P_{12}x-P_{01}x) \Rightarrow P_{012}x$ $P_{12}x+b_{11}(P_{23}x-P_{12}x) \Rightarrow P_{123}x$ $P_{012}x+b_{02}(P_{123}x-P_{012}x) \Rightarrow P_{0123}x$ Calculate y-coordinate:

$P_0y+b_{00}(P_1y-P_0y) \Rightarrow P_{01}y$ $P_1y+b_{10}(P_2y-P_1y) \Rightarrow P_{12}y$ $P_2y+b_{20}(P_3y-P_2y) \Rightarrow P_{23}y$ $P_{01}y+b_{01}(P_{12}y-P_{01}y) \Rightarrow P_{012}y$ $P_{12}y+b_{11}(P_{23}y-P_{12}y) \Rightarrow P_{123}y$ $P_{012}y+b_{02}(P_{123}y-P_{012}y) \Rightarrow P_{0123}y$ Calculate z-coordinate:

$P_0z+b_{00}(P_1z-P_0z) \Rightarrow P_{01}z$ $P_1z+b_{10}(P_2z-P_1z) \Rightarrow P_{12}z$ $P_2z+b_{20}(P_3z-P_2z) \Rightarrow P_{23}z$ $P_{01}z+b_{01}(P_{12}z-P_{01}z) \Rightarrow P_{012}z$ $P_{12}z+b_{11}(P_{23}z-P_{12}z) \Rightarrow P_{123}z$ $P_{012}z+b_{02}(P_{123}z-P_{012}z) \Rightarrow P_{0123}z$ Store the coordinate values:

st $P_{0123}x$ st $P_{0123}y$ st $P_{0123}z$

The vertex data output part 36 outputs the coordinate values of the point determined on the parametric surface as vertex coordinate values of a mesh in association with the two-dimensional parametric coordinate values (u, v) (S26).

FIGS. 12A to 12j are diagrams schematically showing the steps for internally dividing control points in the u and v directions of a parametric surface, thereby determining the point on the parametric surface corresponding to two-dimensional parametric coordinate values (u, v), as well as the tangents at that point.

FIG. 12A shows 16 control points defined for a patch of the parametric surface. Here, the vertical direction of the diagram shall represent the u-axis, and the horizontal direction the v-axis. Four control points $P_0[j]$, $P_1[j]$, $P_2[j]$, and $P_3[j]$ are shown in the u direction. The subscript j in [ ] represents the column number in the v direction, where j=0 to 3.

FIG. 12B shows the result of the first internal division operation in the u direction, applied to the 16 control points of FIG. 12A. By the first internal division operation in the u direction, each of the columns of four control points $P_0[j]$, $P_1[j]$, $P_2[j]$, and $P_3[j]$ arranged in the u direction are internally divided with the first internal division factors $a_{00}$, $a_{10}$, and $a_{20}$. As a result, columns each consisting of three internally dividing points $P_{01}[j]$, $P_{12}[j]$, and $P_{23}[j]$ are obtained. This first internal division operation in the u direction is achieved by the linear interpolation part 72 of the texture unit 70, which performs linear interpolation on the control points stored in the control point texture 52.

FIG. 12C shows the result of the second internal division operation in the u direction, applied to the result of FIG. 12B. By the second internal division operation in the u direction, each of the columns of three internally dividing points $P_{01}[j]$, $P_{12}[j]$, and $P_{23}[j]$ arranged in the u direction are internally divided further with the second internal division factors $a_{01}$ and $a_{11}$. As a result, columns each consisting of two internally dividing points $P_{012}[j]$ and $P_{123}[j]$ are obtained. This second internal division operation in the u direction is performed by the internal division operation part 34 of the pixel shader 32.

FIG. 12D shows the result of the third internal division operation in the u direction, which is applied to the result of FIG. 12C. By the third internal division operation in the u direction, each of the columns of two internally dividing points $P_{012}[j]$ and $P_{123}[j]$ arranged in the u direction are internally divided with the third internal division factor $a_{02}$. As a result, columns each consisting of a single control point $P_{0123}[j]$ are obtained. This third internal division operation in the u direction is also performed by the internal division operation part 34.

The three internal division operations in the u direction are completed through the processing of FIGS. 12B to 12D, whereby the four internally dividing points $P_{0123}[0]$, $P_{0123}[1]$, $P_{0123}[2]$, and $P_{0123}[3]$ arranged in the v direction are obtained.

FIG. 12E shows the result of the first internal division operation in the v direction, which is applied to the result of FIG. 12D. By the first internal division operation in the v direction, the four internally dividing points $P_{0123}[0]$, $P_{0123}[1]$ $P_{0123}[2]$, and $P_{0123}[3]$ arranged in the v direction are internally divided with the first internal division factors $b_{00}$, $b_{10}$, and $b_{20}$. As a result, three internally dividing points $P_{0123\_01}$, $P_{0123\_12}$, and $P_{0123\_23}$ are obtained. This first internal division operation in the v direction is performed by the internal division operation part 34.

FIG. 12F shows the result of the second internal division operation in the v direction, which is applied to the result of FIG. 12E. By the second internal division operation in the v direction, the three internally dividing points $P_{0123\_01}$, $P_{0123\_12}$, and $P_{0123\_23}$ arranged in the v direction are internally divided with the second internal division factors $b_{01}$ and $b_{11}$. As a result, two internally dividing points $P_{0123\_012}$ and $P_{0123\_123}$ are obtained. This second internal division operation in the v direction is also performed by the internal division operation part 34.

FIG. 12G shows the result of the third internal division operation in the v direction, which is applied to the result of FIG. 12F. By the third internal division operation in the v direction, the two internally dividing points $P_{0123\_012}$ and $P_{0123\_123}$ arranged in the v direction are internally divided with the third internal division factor $b_{02}$. As a result, a single internally dividing point $P_{0123\_0123}$ is obtained. This third internal division operation in the v direction is also performed by the internal division operation part 34.

The three internal division operations in the v direction are completed through the processing of FIGS. 12E to 12G, whereby the single internally dividing point $P_{0123\_0123}$ is obtained finally. This is the point on the parametric surface corresponding to the two-dimensional parametric coordinate values (u, v).

In order to determine the tangents at the vertex $P_{0123\_0123}$ finally obtained in the u and v directions, two interpolating operations in the v direction are applied to the result of FIG. 12C which is given two interpolating operations in the u direction.

FIG. 12H shows the result of the first internal division operation in the v direction, which is applied to the result of FIG. 12C. By this first internal division operation in the v direction, the first row of four internally dividing points $P_{012}[0]$, $P_{012}[1]$, $P_{012}[2]$, and $P_{012}[3]$ arranged in the v direction are internally divided with the first internal division factors $b_{00}$, $b_{10}$ and $b_{20}$. As a result, three internally dividing points $P_{012\_01}$, $P_{012\_12}$, and $P_{012\_23}$ are obtained. Similarly, the second row of four internally dividing points $P_{123}[0]$, $P_{123}[1]$, $P_{123}[2]$, and $P_{123}[3]$ arranged in the v direction are internally divided with the first internal division factors $b_{00}$, $b_{10}$, and $b_{20}$. As a result, three internally dividing points $P_{123\_01}$, $P_{123\_12}$, and $P_{123\_23}$ are obtained. This first internal division operation in the v direction is performed by the internal division operation part 34.

FIG. 12I shows the result of the second internal division operation in the v direction, which is applied to the result of FIG. 12H. By this second internal division operation in the v direction, the first row of three internally dividing points $P_{012\_01}$, $P_{012\_12}$, and $P_{012\_23}$ arranged in the v direction are internally divided with the second internal division factors $b_{01}$ and $b_{11}$. As a result, two internally dividing points $P_{012\_012}$ and $P_{012\_123}$ are obtained. Similarly, the second row of three internally dividing points $P_{123\_01}$, $P_{123\_12}$, and $P_{123\_23}$ arranged in the v direction are internally divided with the second internal division factors $b_{01}$ and $b_{11}$. As a result, two internally dividing points $P_{123\_012}$ and $P_{123\_123}$ are obtained.

FIG. 12J shows the tangents in the u and v directions at the vertex coordinates $P_{0123\_0123}$ of FIG. 12G, determined from the result of FIG. 12I. Based on the four internally dividing points of FIG. 12I, the internal division operation part 34 determines a midpoint U between the two top points $P_{012\_012}$ and $P_{123\_012}$, a midpoint D between the two bottom points $P_{123\_012}$ and $P_{123\_123}$, a midpoint L between the two left points $P_{012\_012}$ and $P_{123\_012}$, and a midpoint R between the two right points $P_{012\_123}$ and $P_{123\_123}$. The tangent vector in the u direction at the vertex coordinate $P_{0123\_0123}$ is given by a difference vector between the bottom midpoint D and the top midpoint U. The tangent vector in the v direction is given by a difference vector between the left midpoint L and the right midpoint R.

Hereinafter, description will be given in detail that the knot patterns of a NURBS surface can be limited to nine types when connectivity between adjoining patches is considered, and that the internal division factors for use in the internal division operations on the control points of the NURBS surface can be given by linear expressions of the parameter t.

The NURBS surface is a parametric surface having two parameters u and v. The shape of each patch of the parametric surface is manipulated by 16 control points $P_0$ to $P_{15}$, as well as knot vectors which are sequences of knots that indicate changes in the impact of the respective control points when the parameters u and v vary. When the parametric surface is viewed in the u direction or the v direction, it can be regarded as a parametric curve having a parameter u or v. The shape of each segment of the parametric curve is manipulated by four control points in the u or v direction, as well as a knot vector.

A single parametric surface is formed by generating patches and connecting adjoining patches to each other. The knot vectors to be applied to the respective u and v directions of each patch are determined so as to secure smooth continuity across the junctions of the patches. In the present embodiment, the knot patterns to be applied to the patches are limited to nine types in consideration of the connectivity between adjoining patches. That is, the free-form surface of an object to be drawn is modeled by using a NURBS surface determined by the nine types of knot patterns, not by using arbitrary NURBS surfaces.

Since parametric surfaces can be regarded as parametric curves when viewed in either one of the u and v directions, the following description will deal with the knot patterns of parametric curves. The knot patterns may be specified in the u direction and in the v direction independently.

With a B-spline curve of order four, i.e., degree three, a single segment is defined by four control points. When defined by five control points, the B-spline curve has two segments. When defined by six control points, the B-spline curve has three segments.

Any one of the nine types of knot patterns is used for each single segment. The types and sequence of knot patterns to be used are determined depending on the number of control points for defining the shape of the curve, in consideration of the connectivity between adjoining segments.

When considering the connectivity between adjoining segments, it is the smooth continuity at the endpoints of the segments that matters. Focusing attention on a single segment, an endpoint of the segment is called open if the endpoint coincides with a control point. If not, the endpoint is called closed. In view of the connectivity of the curve, a distinction is also made as to whether or not the endpoints of segments adjoining both ends of the segment in question coincide with control points, i.e., whether the endpoints are open or closed. Moreover, if the segment in question has a closed endpoint, the knot pattern of that segment is determined in consideration of whether the adjoining segment in connection, sharing the endpoint, has an open or closed endpoint.

The connection relationship between segments shall be expressed by a combination of the following: whether the start point and the end point of the segment in question are open or closed; whether a segment adjoining the start-point side of the segment in question has an open or closed start point; and whether a segment adjoining the end-point side of the segment in question has an open or closed end point. That is, the relationship shall be expressed in the form of "(open or closed the start point of the start-point side adjoining segment is):(open or closed the start point of the segment in question is)-(open or closed the end point of the segment in question is):(open or closed the end point of the end-point side adjoining segment is)."

Figure 13A:
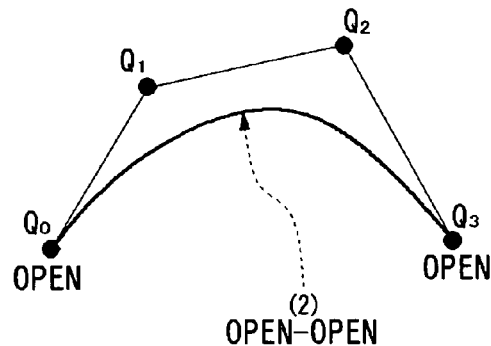
FIGS. 13A to 13C are diagrams for explaining knot patterns with four, five, and six control points.
Figure 13B:
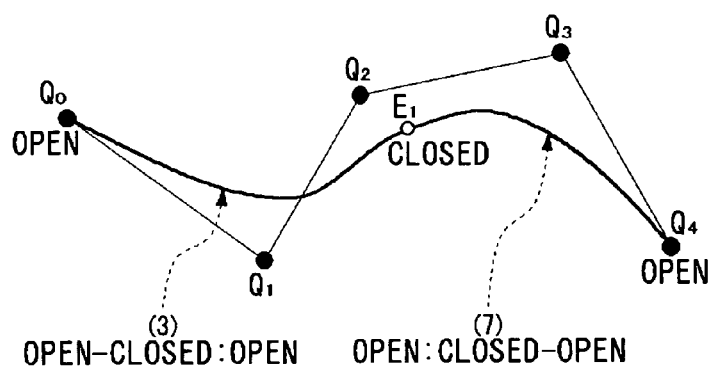
Figure 13C:
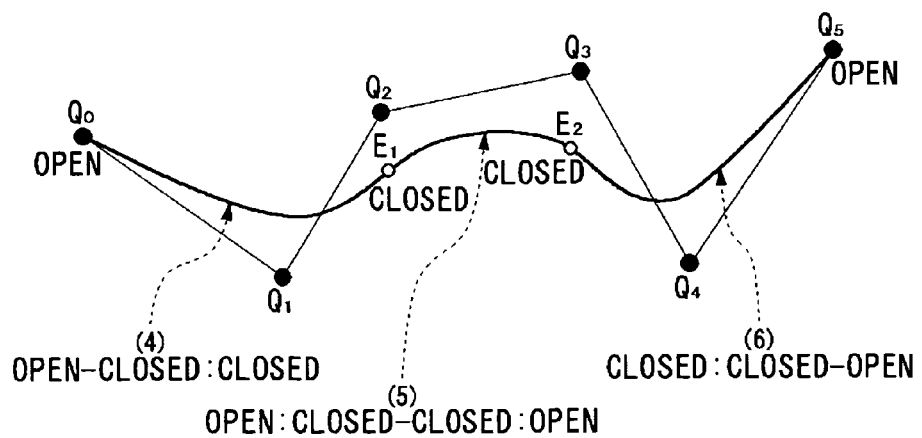

FIGS. 13A to 13C are diagrams for explaining knot patterns with four, five, and six control points.

FIG. 13A shows the knot pattern to be used when defining a NURBS curve by four control points $Q_0$ to $Q_3$. This knot pattern will be referred to as type 2. The start and end points of the segment are open, coinciding with the control points $Q_0$ and $Q_3$, respectively. This knot pattern matches with a Bezier curve.

FIG. 13B shows the knot patterns to be used when defining a NURBS curve by five control points $Q_0$ to $Q_4$. In this case, the NURBS curve is rendered by connecting first and second segments at a connection point $E_1$.

The start point of the first segment is open, coinciding with the control point $Q_0$. On the other hand, the end point of the first segment coincides with the start point of the second segment continuously, but with none of the control points. The end point is thus closed. The second segment, the end-point side adjoining segment of the first segment, has an open end point which coincides with the control point $Q_4$. Consequently, the connection relationship of the first segment is expressed as "open-closed:open." This will be referred to as type 3.

The start point of the second segment is in connection with the end point of the first segment, coinciding with none of the control points, and thus is closed. The end point of the second segment is open, coinciding with the control point $Q_4$. The first segment, the start-point side adjoining segment of the second segment, has an open start point which coincides with the control point $Q_0$. Consequently, the connection relationship of the second segment is expressed as "open closed-open." This will be referred to as type 7.

FIG. 13C shows the knot patterns to be used when defining a NURBS curve by six control points $Q_0$ to $Q_5$. In this case, the NURBS curve is rendered by connecting first, second, and third segments at two connection points $E_1$ and $E_2$.

The start point of the first segment is open, coinciding with the control point $Q_0$. The end point of the first segment is in connection with the start point of the second segment, coinciding with none of the control points, and thus is closed. The second segment, the end-point side adjoining segment of the first segment, has a closed end point which coincides with none of the control points. Consequently, the connection relationship of the first segment is expressed as "open-closed: closed." This will be referred to as type 4.

The start point of the second segment is in connection with the start point of the first segment, coinciding with none of the control points, and thus is closed. The end point of the second segment is in connection with the start point of the third segment, coinciding with none of the control points, and thus is closed. The first segment, the start-point side adjoining segment of the second segment, has an open start point which coincides with the control point $Q_0$. The third segment, the end-point side adjoining segment of the second segment, has an open end point which coincides with the control point $Q_5$. Consequently, the connection relationship of the second segment is expressed as "open:closed-closed open." This will be referred to as type 5.

The start point of the third segment is in connection with the end point of the second segment, coinciding with none of the control points, and thus is closed. The end point of the third segment is open, coinciding with the control point $Q_5$. The second segment, the start-point side adjoining segment of the third segment, has a closed start point. Consequently, the connection relationship of the third segment is expressed as "closed:closed-open." This will be referred to as type 6.

Figure 14A:
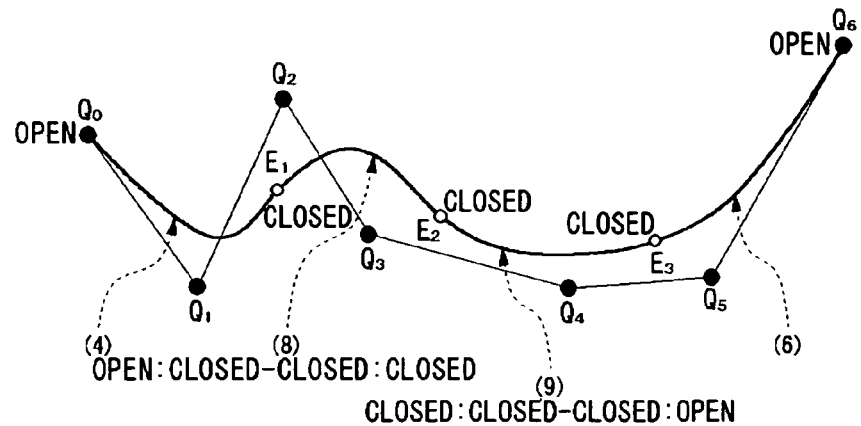
FIGS. 14A to 14C are diagrams for explaining knot patterns with seven, eight, and nine control points.
Figure 14B:
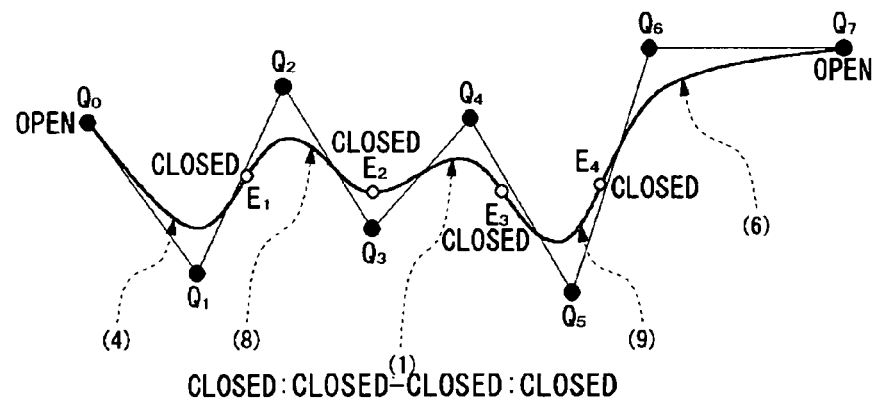
Figure 14C:
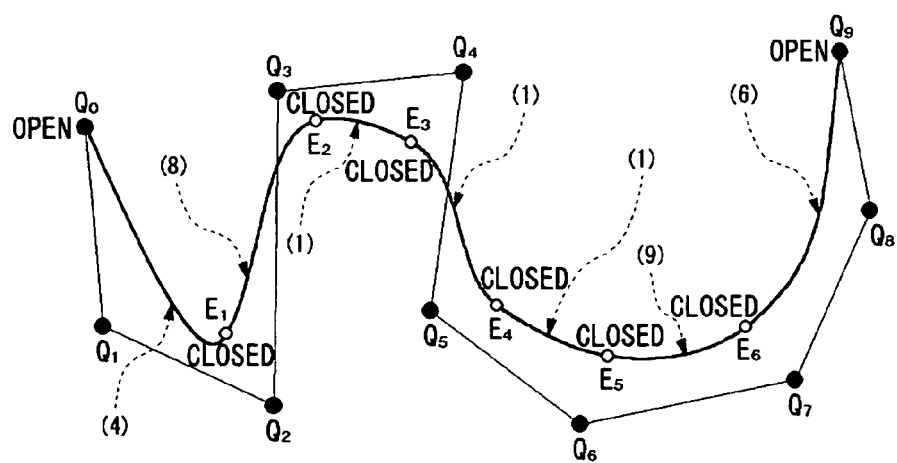

FIGS. 14A to 14C are diagrams for explaining knot patterns with seven, eight, and nine or more control points.

FIG. 14A shows the knot patterns to be used when defining a NURBS curve by seven control points $Q_0$ to $Q_6$. In this case, the NURBS curve is rendered by connecting first to fourth segments at three connection points $E_1$ to $E_3$.

The first segment is of type 4 described previously.

The start point of the second segment is in connection with the start point of the first segment, coinciding with none of the control points, and thus is closed. The end point of the second segment is in connection with the start point of the third segment, coinciding with none of the control points, and thus is closed. The first segment, the start-point side adjoining segment of the second segment, has an open start point which coincides with the control point $Q_0$. The third segment, the end-point side adjoining segment of the second segment, has a closed end point which coincides with none of the control points. Consequently, the connection relationship of the second segment is expressed as "open:closed-closed:closed." This will be referred to as type 8.

The start point of the third segment is in connection with the end point of the second segment, coinciding with none of the control points, and thus is closed. The end point of the third segment is in connection with the start point of the fourth segment, coinciding with none of the control points, and thus is closed. The second segment, the start-point side adjoining segment of the third segment, has a closed start point. The fourth segment, the end-point side adjoining segment of the third segment, has an open end point which coincides with the control point $Q_6$. Consequently, the connection relationship of the third segment is expressed as "closed:closed-closed: open." This will be referred to as type 9.

The fourth segment is of type 6 described previously.

FIG. 14B shows the knot patterns to be used when defining a NURBS curve by eight control points $Q_0$ to $Q_7$. In this case, the NURBS curve is rendered by connecting first to fifth segments at four connection points $E_1$ to $E_4$.

The first segment is of type 4, and the second segment is of type 8 described previously.

The start point of the third segment is in connection with the end point of the second segment, coinciding with none of the control points, and thus is closed. The end point of the third segment is in connection with the start point of the fourth segment, coinciding with none of the control points, and thus is closed. The second segment, the start-point side adjoining segment of the third segment, has a closed start point. The fourth segment, the end-point side adjoining segment of the third segment, has a closed end point which coincides with none of the control points. Consequently, the connection relationship of the third segment is expressed as "closed:closed-closed:closed." This will be referred to as type 1.

The fourth segment is of type 9, and the fifth segment is of type 6 described previously.

FIG. 14C shows the knot patterns to be used when defining a NURBS curve by nine or more control points, or ten control points $Q_0$ to $Q_9$ here. In this case, the NURBS curve is rendered by connecting first to seven segments at six connection points $E_1$ to $E_6$. Given n control points, the NURBS curve is generally rendered by connecting (n−3) segments.

Here, the first to seventh segments are of types 4, 8, 1, 1, 1, 9, and 6, respectively. With nine or more control points, segments of type 1 are thus interposed in the middle.

FIG. 15 summarizes the connection relationship of the segments according to the knot patterns of types 1 to 9 which have been described in FIGS. 13A to 13C and 14A to 14C. As can be seen, the knot patterns are classified into nine types depending on whether the endpoints of a segment in question are open or closed, and whether the endpoints of adjoining segments are open or closed.

Figure 16:
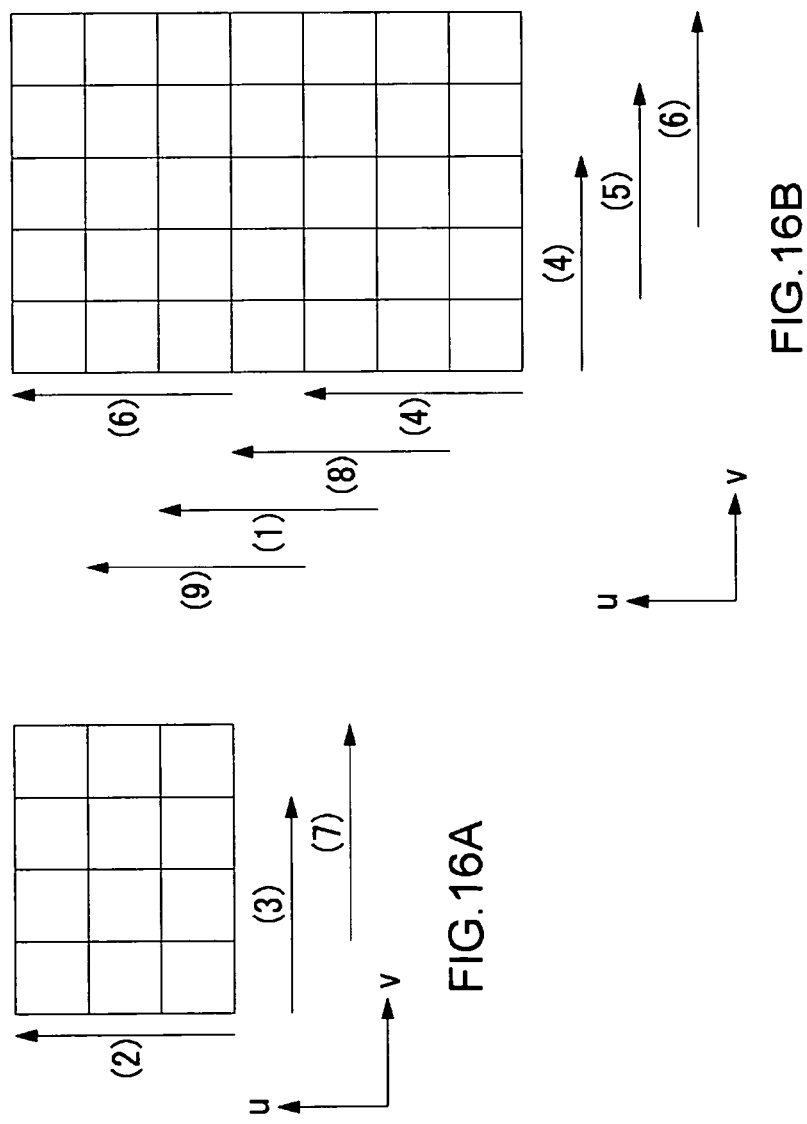
FIGS. 16A to 16C are diagrams for explaining the types of knot patterns to be applied to a parametric surface in each direction of the two-dimensional parametric coordinate system.

FIGS. 16A to 16C are diagrams for explaining the types of knot patterns to be applied to a parametric surface in the u and v directions.

FIG. 16A is a schematic diagram showing a continuous parametric surface on which four control points are arranged in the u direction and five in the v direction. The u direction of this parametric surface corresponds to the case with four control points shown in FIG. 13A. The knot pattern of type 2 is thus applied in the u direction. The v direction of the parametric surface, on the other hand, corresponds to the case with five control points shown in FIG. 13B. The knot pattern of type 3 is thus applied to the first segment in the v direction, and the knot pattern of type 7 to the second segment.

FIG. 16B is a schematic diagram showing a continuous parametric surface on which eight control points are arranged in the u direction and six in the v direction. The u direction of this parametric surface corresponds to the case with eight control points shown in FIG. 14B. The knot patterns of types 4, 8, 1, 9, and 6 are thus applied to the respective segments in the u direction in order. Meanwhile, the v direction of this parametric surface corresponds to the case with six control points shown in FIG. 13C. The knot patterns of types 4, 5, and 6 are thus applied to the respective segments in order.

FIG. 16C is a table for summarizing the sequences of the types of knot patterns to be applied, depending on the number of control points in the u and v directions. The rasterizer 10 uses this table to determine the sequences of the types of knot patterns to be applied to individual segments in the u and v directions of a parametric surface, depending on the numbers of control points in the u and v directions, respectively. The types of knot patterns determined are supplied to the shader unit 30 as parameter information on the individual patches.

Now, description will be given that the internal division factors for dividing control points of a NURBS surface internally are given by linear expressions.

Initially, description will be given of B-spline curves. A B-spline curve of order M, or degree (M−1), can be written as the following equation P(t):

$$P(t) = N_{0,M}(t)Q_0 + N_{1,M}(t)Q_1 + \ldots + N_{n,4}(t)Q_n,$$

where $Q_0, Q_1, \ldots, Q_n$ are the control points.

Here, $N_{0,M}, N_{1,M}, \ldots, N_{n,M}$ are B-spline basis functions, which are also called blending functions. The B-spline basis functions $N_{j,M}$ can be determined recursively by the following de Boor-Cox recurrence formula:

$$N_{j,M}(t) = (t-t_j)/(t_{j+M-1}-t_j) \cdot N_{j,M-1}(t) + (t_{j+M}-t)/(t_{j+M}-t_{j+1}) \cdot N_{j+1,M-1}(t),$$

where $N_{j,1}(t)=1$ ($t_j \leq t < t_{j+1}$), and $N_{j,1}(t)=0$ (otherwise)

As employed in this recurrence formula, $t_j$, $t_{j+M}$, and the like are knots of the parameter t. The B-spline basis functions or blending functions $N_{j,m}$ are determined based on the following knot vector T, which expresses the knots in a sequence of numeric values:

$$T = [t_0, t_1, \ldots, t_{M+N-1}],$$

where N is the number of control points, and M is the order. The number of elements in the knot vector is the sum of the number of control points N and the order M.

Knot vectors T are called uniform if their knots pitches are constant, and called nonuniform if the knot pitches are not constant.

Nonuniform rationalized B-spline curves are NURBS curves. Since NURBS curves have knot vectors T capable of changing the knot pitches, the differential coefficients of the curves can be corrected by means of the ratios of the knot pitches. This facilitates controlling curve configuration, and allows local changes in curve configuration. NURBS curves also have the advantage that they can also render various curves other than B-spline curves, such as Bezier and Hermite curves, in an identical form. Moreover, NURBS involves central projection using rationalized, i.e., homogenous coordinates. This makes it possible to assign weights to the control points, thereby allowing rendering of a perfect circle and the like which cannot be rendered by nonrationalized B-spline curves.

Furthermore, since the foregoing de Boor-Cox recurrence formula for determining the values of blending functions can be applied recursively, computer hardware resources such as registers and arithmetic units can be suitably used for repetitive operations.

The present embodiment deals with B-spline curves of order four, or degree three, which are defined by four control points. Description will thus be given of the case where M=4 and N=4. For example, a uniform B-spline curve of order four, with four control points, has a knot vector T of T=[−3, −2, −1, 0, 1, 2, 3, 4].

FIG. 17 is a diagram for explaining the process of calculating the B-spline basis functions of a B-spline curve having the order M of 4 and the number of control points N of 4, by using the de Boor-Cox recurrence formula.

The parameter t of the segment shall vary within an interval [0, 1], and the knot vectors T of all the nine types of knot patterns are defined as T=[*, *, *, 0, 1, *, *, *] Here, * represents a value that varies with type. Here, in any of the types of the knot patterns, the B-spline basis functions of order one are $N_{j,1}=[0, 0, 0, 1, 0, 0, 0]$.

According to the de Boor-Cox recurrence formula, the jth B-spline basis function of order M, or $N_{j,M}$, is a blend of the jth B-spline basis function of order (M−1), or $N_{j,M-1}$, and the (j+1)th B-spline basis function of order (M−1), or $N_{j+1,M-1}$. Starting from the B-spline basis functions of order one $N_{j,1}=[0, 0, 0, 1, 0, 0, 0]$, all the B-spline basis functions up to the fourth order can be determined by calculating those of orders two, three, and four in succession. The diagram shows the process of this calculation.

For example, from the B-spline basis functions of order one, the B-spline basis functions of order two are calculated as follows:

$$N_{2,2}(t) = 0 + (t_4-t)/(t_4-t_3) \cdot N_{3,1}(t); \text{ and}$$

$$N_{3,2}(t) = (t-t_3)/(t_4-t_3) \cdot N_{3,1}(t) + 0.$$

Similarly, from the B-spline basis functions of order two, the B-spline basis functions of order three are calculated as follows:

$$N_{1,3}(t) = 0 + (t_4-t)/(t_4-t_2) \cdot N_{2,2}(t)$$

$$N_{2,3}(t) = (t-t_2)/(t_4-t_2) \cdot N_{2,2}(t) + (t_5-t)/(t_5-t_3) \cdot N_{3,2}(t); \text{ and}$$

$$N_{3,3}(t) = (t-t_3)/(t_5-t_3) \cdot N_{3,2}(t) + 0.$$

For ease of explanation, blending factors of the de Boor-Cox recurrence formula to be used when blending the jth B-spline basis function of order (M−1), or $N_{j,M-1}$, and the (j+1)th B-spline basis function of order (M−1), or $N_{j+1, M-1}$, shall be defined as follows:

$$A_{j,M} = (t-t_j)/(t_{j+M-1}-t_j); \text{ and}$$

$$B_{j,M} = (t_{j+M}-t)/(t_{j+M}-t_{j+1}).$$

Using the blending factors $A_{j,M}$ and $B_{j,M}$, the de Boor-Cox recurrence formula can be written as:

$$N_{j,m}(t) = A_{j,M} \cdot N_{j,M-1}(t) + B_{j,M} \cdot N_{j+1,M-1}(t).$$

FIG. 18 shows the calculation process of FIG. 17, modified by using the blending factors $A_{j,M}$ and $B_{j,M}$. According to this calculation process, the B-spline basis functions are determined by the following recurrence formulas.

Recurrence formulas for determining the B-spline basis functions of order four:

$$N_{0,4}(t) = B_{0,4} N_{1,3}(t);$$

$$N_{1,4}(t) = A_{1,4} N_{1,3}(t) + B_{1,4} N_{2,3}(t);$$

$$N_{2,4}(t) = A_{2,4} N_{2,3}(t) + B_{2,4} N_{3,3}(t); \text{ and}$$

$$N_{3,4}(t) = A_{3,4} N_{3,3}(t).$$

Recurrence formulas for determining the B-spline basis functions of order three:

$$N_{1,3}(t) = B_{1,3} N_{2,2}(t);$$

$$N_{2,3}(t) = A_{2,3} N_{2,2}(t) + B_{2,3} N_{3,2}(t); \text{ and}$$

$$N_{3,3}(t) = A_{3,3} N_{3,2}(t).$$

Recurrence formulas for determining the B-spline basis functions of order two:

$$N_{2,2}(t) = B_{2,2} N_{3,1}(t); \text{ and}$$

$$N_{3,2}(t) = A_{3,2} N_{3,1}(t).$$

The B-spline basis function of order one is given by $$N_{3,1}(t) = 1.$$

When the foregoing recurrence formulas for determining the B-spline basis functions of order four are applied, the equation P(t) of the B-spline curve can be modified as follows:

$$P(t)=Q_0N_{0,4}(t)+Q_1N_{1,4}(t)+Q_2N_{2,4}(t)+Q_3N_{3,4}(t)$$
$$=Q_0\{B_{0,4}N_{1,3}(t)\}+Q_1\{A_{1,4}N_{1,3}(t)+B_{1,4}N_{2,3}(t)\}+$$
$$Q_2\{A_{2,4}N_{2,3}(t)+B_{2,4}N_{3,3}(t)\}+Q_3\{A_{3,4}N_{3,3}(t)\}=$$
$$N_{1,3}(t)\{Q_0B_{0,4}+Q_1A_{1,4}\}+N_{2,3}(t)\{Q_1B_{1,4}+$$
$$Q_2A_{2,4}\}+N_{3,3}(t)\{Q_2B_{2,4}+Q_3A_{3,4}\}.$$

Since $B_{0,4}+A_{1,4}=(t_4-t)/(t_4-t_1)+(t-t_1)/(t_4-t_1)=1$, it can be seen that the calculation $Q_0B_{0,4}+Q_1A_{1,4}$ is equivalent to determining the point $Q_{01}$ that divides the two points $Q_0$ and $Q_1$ internally at a ratio of $A_{1,4}:B_{0,4}$.

In general, $B_{j,M}+A_{j+1,M}=(t_{j+M}-t)/(t_{j+M}-t_{j+1})+(t-t_{j+1})/(t_{j+M}-t_{j+1})=1$. Thus, the calculation $Q_1B_{1,4}+Q_2A_{2,4}$ is equivalent to determining the point $Q_{12}$ that divides the two points $Q_1$ and $Q_2$ internally at a ratio of $A_{2,4}:B_{1,4}$. The calculation $Q_2B_{2,4}+Q_3A_{3,4}$ is equivalent to determining the point $Q_{23}$ that divides the two points $Q_2$ and $Q_3$ internally at a ratio of $A_{3,4}:B_{2,4}$.

Hence, using the internally dividing points $Q_{01}$, $Q_{12}$, and $Q_{23}$, the equation P(t) can be written as:

$$P(t)=N_{1,3}(t)Q_{01}+N_{2,3}(t)Q_{12}+N_{3,3}(t)Q_{23}.$$

When the recurrence formulas for determining the B-spline basis functions of order three are applied further, this equation can be modified as follows:

$$P(t)=Q_{01}\{B_{1,3}N_{2,2}(t)\}+Q_{12}\{A_{2,3}N_{2,2}(t)+B_{2,3}N_{3,2}(t)\}+$$
$$Q_{23}\{A_{3,3}N_{3,2}(t)\}=N_{2,2}(t)\{Q_{01}B_{1,3}+Q_{12}A_{2,3}\}+N_{3,2}$$
$$(t)\{Q_{12}B_{2,3}+Q_{23}A_{3,3}\}.$$

Here, the calculation $Q_{01}B_{1,3}+Q_{12}A_{2,3}$ is equivalent to determining the point $Q_{12}$ that divides the two points $Q_{01}$ and $Q_{12}$ internally at a ratio of $A_{2,3}:B_{1,3}$. The calculation $Q_{12}B_{2,3}+Q_{23}A_{3,3}$ is equivalent to determining the point $Q_{123}$ that divides the two points $Q_{12}$ and $Q_{23}$ internally at a ratio of $A_{3,3}:B_{2,3}$.

Using the internally dividing points $Q_{012}$ and $Q_{123}$, the equation P(t) can thus be written as:

$$P(t)=N_{2,2}(t)Q_{012}+N_{3,2}(t)Q_{123}.$$

When the recurrence formulas for determining the B-spline basis functions of order two are applied further, this equation can be modified as follows:

$$P(t)=Q_{012}B_{2,2}N_{3,1}(t)+Q_{123}A_{3,2}N_{3,1}(t)=N_{3,1}(t)$$
$$\{Q_{012}B_{2,2}+Q_{123}A_{3,2}\}.$$

Here, the calculation $Q_{012}B_{2,2}+Q_{123}A_{3,2}$ is equivalent to determining the point $Q_{0123}$ that divides the two points $Q_{012}$ and $Q_{123}$ at a ratio of $A_{3,2}:B_{2,2}$.

Using the internally dividing point $Q_{0123}$, the equation P(t) can thus be written as:

$$P(t)=N_{3,1}(t)Q_{0123}.$$

Since the B-spline basis function of order one $N_{3,1}(t)=1$, then $P(t)=Q_{0123}$.

The foregoing shows that the point P(t) on the B-spline curve of order four, corresponding to the parameter t, can be determined by repeating internal division calculations between adjoining points onto the four control points $Q_0$, $Q_1$, $Q_2$, and $Q_3$ three times recursively.

More specifically, in the first internal division calculation, internal divisions are calculated between adjoining control points out of the four control points $Q_0$, $Q_1$, $Q_2$, and $Q_3$, whereby the three internally dividing points $Q_{01}$, $Q_{12}$, and $Q_{23}$ are determined. In the second calculation, internal divisions are calculated between adjoining internally dividing points out of the three internally dividing points $Q_{01}$, $Q_{12}$, and $Q_{23}$, whereby two internally dividing points $Q_{012}$ and $Q_{123}$ are determined. In the third calculation, an internal division between the two internally dividing points $Q_{012}$ and $Q_{123}$ is calculated to determine the internally dividing point $Q_{0123}$. The internally dividing point $Q_{0123}$ resulting from the third internal division calculation is the point P(t).

The foregoing method of determining a point on a B-spline curve by dividing control points internally in a recursive fashion is an application of a calculation method known as de Casteljau's algorithm. The de Casteljau's algorithm is commonly known as a calculation method for Bezier curves. It can be seen that the de Casteljau's algorithm is also applicable to B-spline curves when the de Boor-Cox recurrence formulas are modified thus.

In summary, the recurrence formulas for determining a point on a B-spline curve of order four from four control points $Q_0$, $Q_1$, $Q_2$, and $Q_3$ are the following:

First internal division calculation:

$$Q_{01}=(t_4-t)/(t_4-t_1)\cdot Q_0+(t-t_1)/(t_4-t_1)\cdot Q_1;$$

$$Q_{12}=(t_5-t)/(t_5-t_2)\cdot Q_1+(t-t_2)/(t_5-t_2)\cdot Q_2; \text{ and}$$

$$Q_{23}=(t_6-t)/(t_6-t_3)\cdot Q_2+(t-t_3)/(t_6-t_3)\cdot Q_3.$$

Second internal division calculation:

$$Q_{012}=(t_4-t)/(t_4-t_2)\cdot Q_{01}+(t-t_2)/(t_4-t_2)\cdot Q_{12}; \text{ and}$$

$$Q_{123}=(t_5-t)/(t_5-t_3)\cdot Q_{12}+(t-t_3)/(t_5-t_3)\cdot Q_{23}.$$

Third internal division calculation:

$$Q_{0123}=(t_4-t)/(t_4-t_3)\cdot Q_{012}+(t-t_3)/(t_4-t_3)\cdot Q_{123}.$$

Letting:

$$a_{00}(t)=(t-t_1)/(t_4-t_1);$$

$$a_{10}(t)=(t-t_2)/(t_5-t_2);$$

$$a_{20}(t)=(t-t_3)/(t_6-t_3);$$

$$a_{01}(t)=(t-t_2)/(t_4-t_2);$$

$$a_{11}(t)=(t-t_3)/(t_5-t_3); \text{ and}$$

$$a_{02}(t)=(t-t_3)/(t_4-t_3),$$

then,

First internal division calculation:

$$Q_{01}=(1-a_{00}(t))Q_0+a_{00}(t)Q_1;$$

$$Q_{12}=(1-a_{10}(t))Q_1+a_{10}(t)Q_2; \text{ and}$$

$$Q_{23}=(1-a_{20}(t))Q_2+a_{20}(t)Q_3.$$

Second internal division calculation:

$$Q_{012}=(1-a_{01}(t))Q_{01}+a_{01}(t)Q_{12}; \text{ and}$$

$$Q_{123}=(1-a_{11}(t))Q_{12}+a_{11}(t)Q_{23}.$$

Third internal division calculation:

$$Q_{0123}=(1-a_{02}(t))Q_{012}+a_{02}(t)Q_{123}.$$

For each of the types of the knot patterns, a knot vector $T=[t_0, t_1, \ldots, t_7]$ is defined as described below. Note that $t_0$ and $t_7$ may have any value since they are not involved in the calculations. Internal division factors determined for each of the knot vectors T will also be shown below.

Type 1:

Knot vector $T=[-3, -2, -1, 0, 1, 2, 3, 4]$.

Here, the internal division factors are $a_{00}(t)=(t+2)/3$, $a_{10}(t)=(t+1)/3$, $a_{20}(t)=t/3$, $a_{01}(t)=(t+1)/2$, $a_{11}(t)=t/2$, and $a_{02}(t)=t$.

Type 2:

Knot vector T=[0, 0, 0, 0, 1, 1, 1, 1].

Here, the internal division factors are $a_{00}(t)=t$, $a_{10}(t)=t$, $a_{20}(t)=t$, $a_{01}(t)=t$, $a_{11}(t)=t$, and $a_{02}(t)=t$.

Type 3:

Knot vector T=[0, 0, 0, 0, 1, 2, 2, 2].

Here, the internal division factors are $a_{00}(t)=t$, $a_{10}(t)=t/2$, $a_{20}(t)=t/2$, $a_{01}(t)=t$, $a_{11}(t)=t/2$, and $a_{02}(t)=t$.

Type 4:

Knot vector T=[0, 0, 0, 0, 1, 2, 3, 4].

Here, the internal division factors are $a_{00}(t)=t$, $a_{10}(t)=t/2$, $a_{20}(t)=t/3$, $a_{01}(t)=t$, $a_{11}(t)=t/2$, and $a_{02}(t)=t$.

Type 5:

Knot vector T=[−1, −1, −1, 0, 1, 2, 2, 2].

Here, the internal division factors are $a_{00}(t)=(t+1)/2$, $a_{10}(t)=(t+1)/3$, $a_{20}(t)=t/2$, $a_{01}(t)=(t+1)/2$, $a_{11}(t)=t/2$, and $a_{02}(t)=t$.

Type 6:

Knot vector T=[−3, −2, −1, 0, 1, 1, 1, 1].

Here, the internal division factors are $a_{00}(t)=(t+2)/3$, $a_{10}(t)=(t+1)/2$, $a_{20}(t)=t$, $a_{01}(t)=(t+1)/2$, $a_{11}(t)=t$, and $a_{02}(t)=t$.

Type 7:

Knot vector T=[−1, −1, −1, 0, 1, 1, 1, 1].

Here, the internal division factors are $a_{00}(t)=(t+1)/2$, $a_{10}(t)=(t+1)/2$, $a_{20}(t)=t$, $a_{01}(t)=(t+1)/2$, $a_{11}(t)=t$, and $a_{02}(t)=t$.

Type 8:

Knot vector T=[−1, −1, −1, 0, 1, 2, 3, 4].

Here, the internal division factors are $a_{00}(t)=(t+1)/2$, $a_{10}(t)=(t+1)/3$, $a_{20}(t)=t/3$, $a_{01}(t)=(t+1)/2$, $a_{11}(t)=t/2$, and $a_{02}(t)=t$.

Type 9:

Knot vector T=[−3, −2, −1, 0, 1, 2, 2, 2].

Here, the internal division factors are $a_{00}(t)=(t+2)/3$, $a_{10}(t)=(t+1)/3$, $a_{20}(t)=t/2$, $a_{01}(t)=(t+1)/2$, $a_{11}(t)=t/2$, and $a_{02}(t)=t$.

FIG. 19 summarizes the internal division factors for the respective types of knot patterns. As can be seen, all the internal division factors are given by linear expressions of t. During the tessellation processing, the parameter t takes on discrete values in the interval [0, 1] at predetermined pitches depending on the number of divisions at which the parametric curve is divided into patches. To determine a point on a B-spline curve requires that the values of the internal division factors $a_{ij}(t)$ be calculated for all the discrete values of the parameter t. The values of the internal division factors $a_{ij}(t)$ for all the discrete values of the parameter t, however, need not be prepared in advance because the internal division factors $a_{ij}(t)$ are given by the linear expressions of the parameter t. That is, if two values at t=0 and 1, or the initial value $a_{ij}(0)$ and the final value (1), of each internal division factor are stored previously, $a_{ij}(t)$ for any value of t:(0<t<1) can be determined by interpolating the initial value $a_{ij}(0)$ and the final value $a_{ij}(1)$ linearly at a ratio of t:(1−t). In the present embodiment, this characteristic is effectively utilized in the texture unit 70.

As has been described, according to the present embodiment, part of the internal division calculations necessary for the recursive internal division operations of control points on a parametric surface is performed by utilizing the linear interpolator of the texture unit 70. This improves the processing efficiency of the entire drawing processing apparatus 100 as compared to the cases where all the internal division calculations are performed by using the arithmetic units of the pixels shaders 32.

Among the values of the internal division factors which vary depending on the two-dimensional parametric coordinate values, the initial values and final values alone are stored in the form of a texture. It is therefore possible to acquire the internal division factors for any two-dimensional parametric coordinate values efficiently by interpolating the texture. Since the texture has only to contain the initial values and final values of the internal division factors, it is possible to suppress the memory capacity necessary for the tessellation processing. Moreover, the control points of the parametric surface can also be stored as a texture, so that the first internal division operation can be performed efficiently by interpolating the texture.

Up to this point, the present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention. Some such modifications will be described below.

The foregoing description has dealt with the tessellation processing in which a parametric surface defined by a two-dimensional parametric coordinate system is subdivided into meshes patch by patch. Nevertheless, tessellation processing in which a parametric curve defined by a one-dimensional parametric coordinate system is subdivided into lines segment by segment is also applicable. In the tessellation processing on a parametric curve, line primitives can be supplied to the rasterizer 10 as drawing primitives.

The foregoing description has dealt with the case where the initial values $a_{ij}(0)$ and the final values $a_{ij}(1)$ of the internal division factors dependent on the parameter t are linearly interpolated to determine the values of the internal division factors $a_{ij}(t)$ corresponding to a specified parameter t. Nevertheless, since the internal division factors $a_{ij}(t)$ are linear expressions of the parameter t, the internal division factor texture 54 is not limited to the initial and final values but may contain internal division factors $a_{ij}(t_1)$ and aij($t_2$) at any two different parameter values $t_1$ and $t_2$ as the representative values. Then, linear interpolation between these representative values can be performed to determine the values of internal division factors $a_{ij}(t)$ at the specified parameter t. Incidentally, this linear interpolation includes not only sole interpolation but extrapolation as well.

The embodiment has dealt with the case where only the first internal division operation on the control points in the u direction is performed by using the linear interpolation function of the texture unit 70. Nevertheless, the second and third internal division operations may also be performed by using the linear interpolation function of the texture unit 70. In that case, another interface is provided so that the pixel shaders 32, after receiving the control points internally divided at the first internal division factors in advance from the texture unit 70, can subject the internally-divided control points to the first texture unit 70. The texture unit 70 further divides the control points subjected from the pixel shaders 32 internally with the second internal division factors by using the linear interpolator, and outputs the results to the pixel shaders 32. The pixel shaders 32 receive the control points internally divided at the second internal division factors from the texture unit 70, and subject the same to the texture unit 70 further. The texture unit 70 divides them internally with the third internal division factor further, and returns the results to the pixel shaders 32. Consequently, all the internal division calculations necessary for the tessellation processing can be achieved by using the linear interpolation function of the texture unit 70. The linear interpolation part 72 of the texture unit 70 may be configured so that the result of linear interpolation can be fed back and input again.

What is claimed is:

1. A drawing processing apparatus for making an approximation to an object to be drawn with a parametric curve represented by coordinate points associated with a single parameter, the apparatus comprising:

a factor data memory part which stores a group of representative values of an internal division factor at two points in a domain of the parameter in a one-dimensional parametric coordinate system defined for each of segments, or component units, of the parametric curve, the internal division factor being given by a linear function of the parameter;

an interpolation processing part which interpolates the group of representative values of the internal division factor stored in the factor data memory part by using a linear interpolator with a value of the parameter specified in a segment to be processed as an interpolation factor, thereby calculating an interpolated value of the internal division factor corresponding to the specified value of the parameter; and a subdivision processing part which performs an internal division operation on a plurality of control points defining shape of the segment to be processed at a ratio based on the interpolated value of the internal division factor, thereby calculating a vertex coordinate on the parametric curve corresponding to the specified value of the parameter in the segment to be processed, wherein:

if the parametric curve has knots at non-uniform pitches, a plurality of types of knot patterns having the knots of different pitches are determined based on connection relationship with adjoining segments, and the factor data memory part stores groups of representative values of internal division factors at two points in the domain of the parameter, the internal division factors corresponding to the plurality of types of knot patterns, respectively; and when one of the knot patterns to be applied to the segment to be processed is specified, the interpolation processing part interpolates the group of representative values of the internal division factors corresponding to the specified knot pattern at a ratio based on the specified value of the parameter, thereby calculating an interpolated value of the internal division factor corresponding to the specified value of the parameter.

2. The drawing processing apparatus according to claim 1, wherein the internal division operation of the subdivision processing part is one for internally dividing the plurality of control points in the segment recursively at a ratio based on the interpolated value of the internal division factor.

3. The drawing processing apparatus according to claim 1, further comprising a control point data memory part which stores groups of a plurality of control points defining the shape of the respective segments, and wherein:

the interpolation processing part acquires the plurality of control points to be applied to the segment to be processed from the control point data memory part, internally divides the plurality of acquired control points by using the linear interpolator at a ratio based on the interpolated value of the internal division factor in advance, and supplies the resultant to the subdivision processing part; and the subdivision processing part performs an internal division operation further on the plurality of control points internally divided by the interpolation processing part, at a ratio based on the interpolated value of the internal division factor.

4. A drawing processing apparatus for making an approximation to an object to be drawn with a parametric surface represented by coordinate points associated with a pair of parameters, the apparatus comprising:

a factor data memory part which stores a group of representative values of a first internal division factor at two points in a domain of a first parameter in a two-dimensional parametric coordinate system defined for each of patches, or component units, of the parametric surface, the first internal division factor being given by a linear function of the first parameter;

an interpolation processing part which interpolates the group of representative values of the first internal division factor stored in the factor data memory part by using a linear interpolator with a value of the first parameter specified in a patch to be processed as an interpolation factor, thereby calculating an interpolated value of the first internal division factor corresponding to the specified value of the first parameter; and a subdivision processing part which performs an internal division operation on a plurality of control points defining shape of the patch to be processed in an axial direction of the first parameter in the two-dimensional parametric coordinate system at a ratio based on the interpolated value of the first internal division factor, wherein if the parametric surface has knots at non-uniform pitches, a plurality of types of knot patterns having the knots of different pitches are determined based on connection relationship with adjoining patches, and the factor data memory part stores groups of representative values of internal division factors at two points in the domain of the parameter, the internal division factors corresponding to the plurality of types of knot patterns, respectively; and when one of the knot patterns to be applied to the patch to be processed is specified, the interpolation processing part interpolates the group of representative values of the internal division factors corresponding to the specified knot pattern at a ratio based on the specified value of the parameter, thereby calculating an interpolated value of the internal division factor corresponding to the specified value of the parameter.

5. The drawing processing apparatus according to claim 4, wherein:

the factor data memory part stores a group of representative values of a second internal division factor at two points in a domain of a second parameter in the two-dimensional parametric coordinate system, the second internal division factor being given by a linear function of the second parameter;

the interpolation processing part interpolates the group of representative values of the second internal division factor by using the linear interpolator with a value of the second parameter specified in the patch to be processed as an interpolation factor, thereby calculating an interpolated value of the second internal division factor corresponding to the specified value of the second parameter; and the subdivision processing part performs an internal division operation further on the plurality of control points internally divided in the axial direction of the first parameter, at a ratio based on the interpolated value of the second internal division factor in an axial direction of the second parameter in the two-dimensional parametric coordinate system, thereby calculating vertex coordinates on the parametric surface corresponding to the specified values of the two-dimensional parametric coordinates in the patch to be processed.

* * * * *